(12) United States Patent
Najorka et al.

(10) Patent No.: US 12,084,006 B2
(45) Date of Patent: Sep. 10, 2024

(54) OPTICAL MONITORING DEVICE

(71) Applicant: EchoVista GmbH, Seligenstadt (DE)

(72) Inventors: Lars Najorka, Langen (DE); Steffen Walter, Seligenstadt (DE); Ole Gustav Johannessen, Southampton (GB); Oliver Simon Matthews, Seligenstadt (DE); Mincheol Shin, Seligenstadt (DE)

(73) Assignee: EchoVista GmbH, Seligenstadt (DE)

( * ) Notice: Subject to any disclaimer, the term of this patent is extended or adjusted under 35 U.S.C. 154(b) by 0 days.

(21) Appl. No.: 18/144,260

(22) Filed: May 8, 2023

(65) Prior Publication Data

US 2023/0356696 A1    Nov. 9, 2023

Related U.S. Application Data

(63) Continuation of application No. 16/766,681, filed as application No. PCT/EP2018/074942 on Sep. 14, 2018, now Pat. No. 11,820,337.

(30) Foreign Application Priority Data

Nov. 24, 2017   (DE) ..................... 10 2017 127 855.9

(51) Int. Cl.
*B06B 1/06*       (2006.01)
*B08B 7/02*       (2006.01)
(Continued)

(52) U.S. Cl.
CPC .............. *B60S 1/62* (2013.01); *B06B 1/0622* (2013.01); *B06B 1/0659* (2013.01); *B08B 7/028* (2013.01); *G02B 27/0006* (2013.01)

(58) Field of Classification Search
None
See application file for complete search history.

(56) References Cited

U.S. PATENT DOCUMENTS

2003/0214599 A1   11/2003   Ito et al.
2008/0030714 A1    2/2008   Hall et al.
(Continued)

FOREIGN PATENT DOCUMENTS

| CN | 101542889 | 9/2009 |
|---|---|---|
| CN | 101819324 | 9/2010 |

(Continued)

OTHER PUBLICATIONS

DE 102015121026 A1 translation, Ultrasonic Lens Cleaning Conveyor, Weigert (Year: 2016).*
(Continued)

*Primary Examiner* — Cristi J Tate-Sims

(57) ABSTRACT

An optical monitoring system serves to monitor surroundings, having a monitoring apparatus, the visual or scanning field of which is captured by a lens, and a protection panel (112) which protects the lens from precipitation and covers at least the visual or scanning field of the monitoring apparatus. In order to avoid the signal quality of the monitoring apparatus being impaired by precipitation on the protection panel, it is proposed that the protection panel (12; 112; 218; 318) is acoustically coupled to at least one ultrasonic transducer (10). The optical monitoring system can be included into the control system of a vehicle for autonomous driving, wherein, overall, it is possible to obtain increased safety of the control system.

14 Claims, 20 Drawing Sheets

(51) Int. Cl.
  *B60S 1/62*     (2006.01)
  *G02B 27/00*   (2006.01)

(56)               References Cited

U.S. PATENT DOCUMENTS

| 2008/0297641 | A1  | 12/2008 | Urakami |
| 2009/0015705 | A1  | 1/2009  | Urakami |
| 2009/0207493 | A1  | 8/2009  | Ohashi |
| 2012/0243093 | A1  | 9/2012  | Tonar et al. |
| 2014/0036084 | A1  | 2/2014  | Lu |
| 2015/0089754 | A1  | 4/2015  | Chan et al. |
| 2016/0202508 | A1* | 7/2016  | Hicks .................... G01N 21/01 250/573 |
| 2018/0239218 | A1  | 8/2018  | Ikeuchi et al. |
| 2019/0176195 | A1  | 6/2019  | Fujimoto et al. |
| 2020/0384958 | A1  | 12/2020 | Najorka et al. |

FOREIGN PATENT DOCUMENTS

| CN | 102580952       | 7/2012  |
| DE | 4217559         | 12/1993 |
| DE | 10103197        | 7/2002  |
| DE | 60303617        | 9/2006  |
| DE | 102015121026    | 6/2016  |
| EP | 2115865         | 11/2009 |
| JP | 2008-301273     | 12/2008 |
| JP | 2017-085276     | 5/2017  |
| WO | WO 2012/095643  | 7/2012  |
| WO | WO 2015/011064  | 1/2015  |
| WO | WO 2017/022382  | 2/2017  |
| WO | WO 2017/110563  | 6/2017  |
| WO | WO 2018/100795  | 6/2018  |
| WO | WO 2019/101388  | 5/2019  |

OTHER PUBLICATIONS

Examination Report Under Sections 12 & 13 of the Patents Act, 1970 and the Patents Rules, 2003 Dated Mar. 9, 2021 From the Government of India, Intellectual Property India, Patents, Designs, Trade Marks, Geographical Indications, The Patent Office Re. Application No. 201947009680. (6 Pages).
International Preliminary Report on Patentability Dated May 26, 2020 From the International Bureau of WIPO Re. Application No. PCT/EP2018/074942. (10 Pages).
Internationaler Recherchenbericht und Schriftlicher Bescheid [International Search Report and the Written Opinion] Dated Feb. 22, 2019 From the International Searching Authority Re. Application No. PCT/EP2018/074942 and Its Translation Into English. (31 Pages).
Notice of Allowance Dated Apr. 26, 2023 from the Re. U.S. Appl. No. 16/766,681. (5 pages).
Official Action Dated Oct. 4, 2022 from Re. U.S. Appl. No. 16/766,681. (18 pages).
Pruefungsantrag [Request for Examination] Dated Feb. 28, 2018 From the Deutsches Patent- und Markenamt [German Patent and Trademark Office] Re. Application No. 102017127855.9. (6 Pages).
Translation Dated Jan. 5, 2022 of Notification of Office Action Dated Nov. 3, 2021 From the State Intellectual Property Office of the People's Republic of China Re. Application No. 2018800756477. (9 Paages).

* cited by examiner

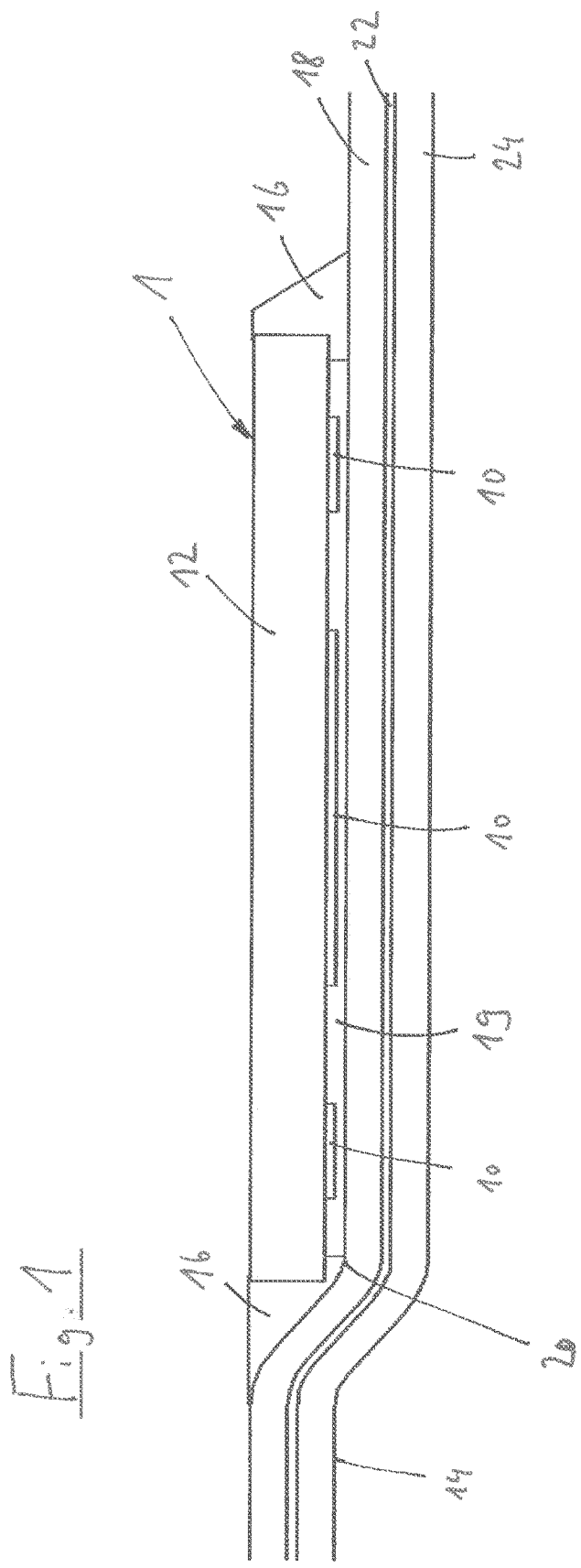

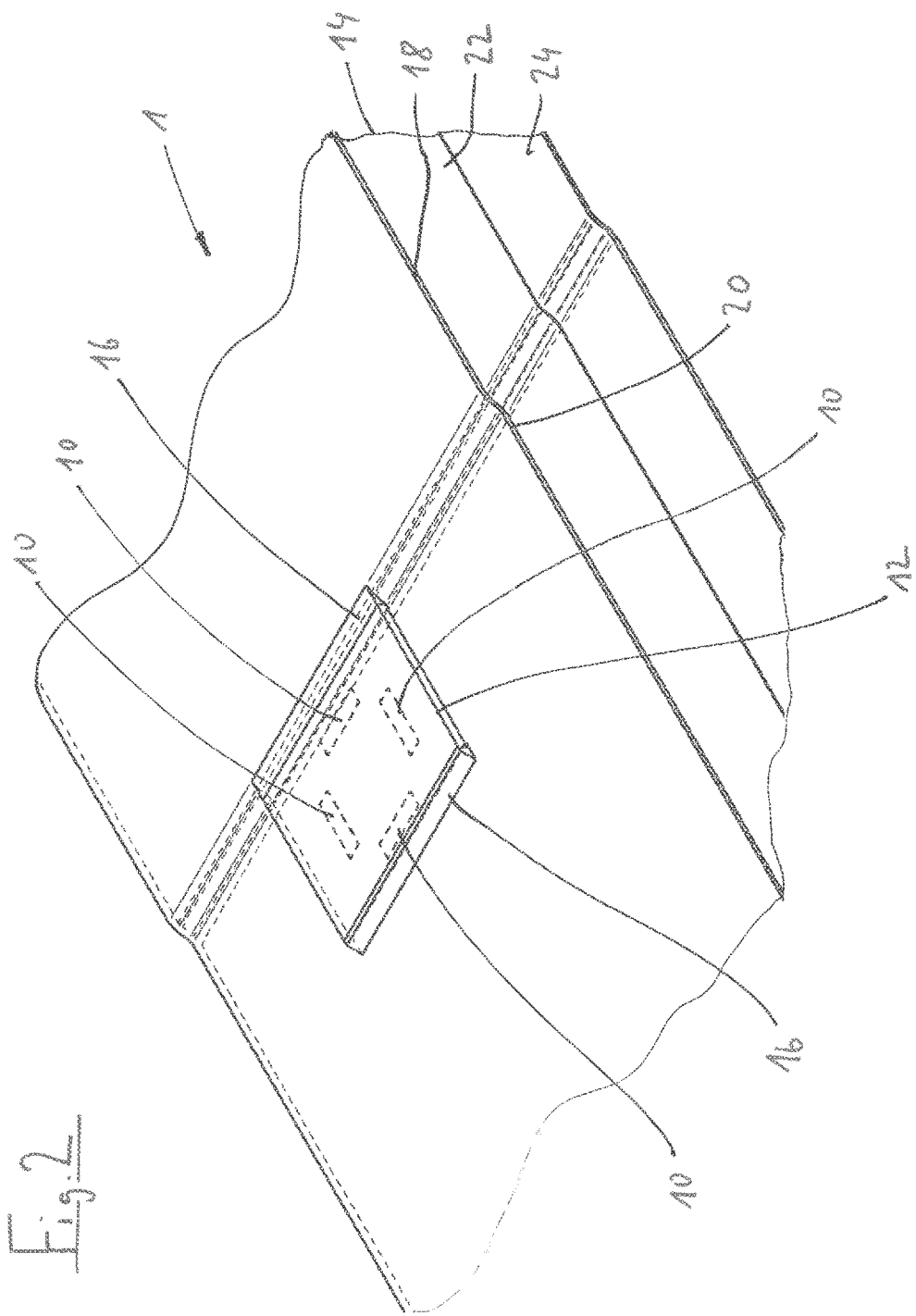

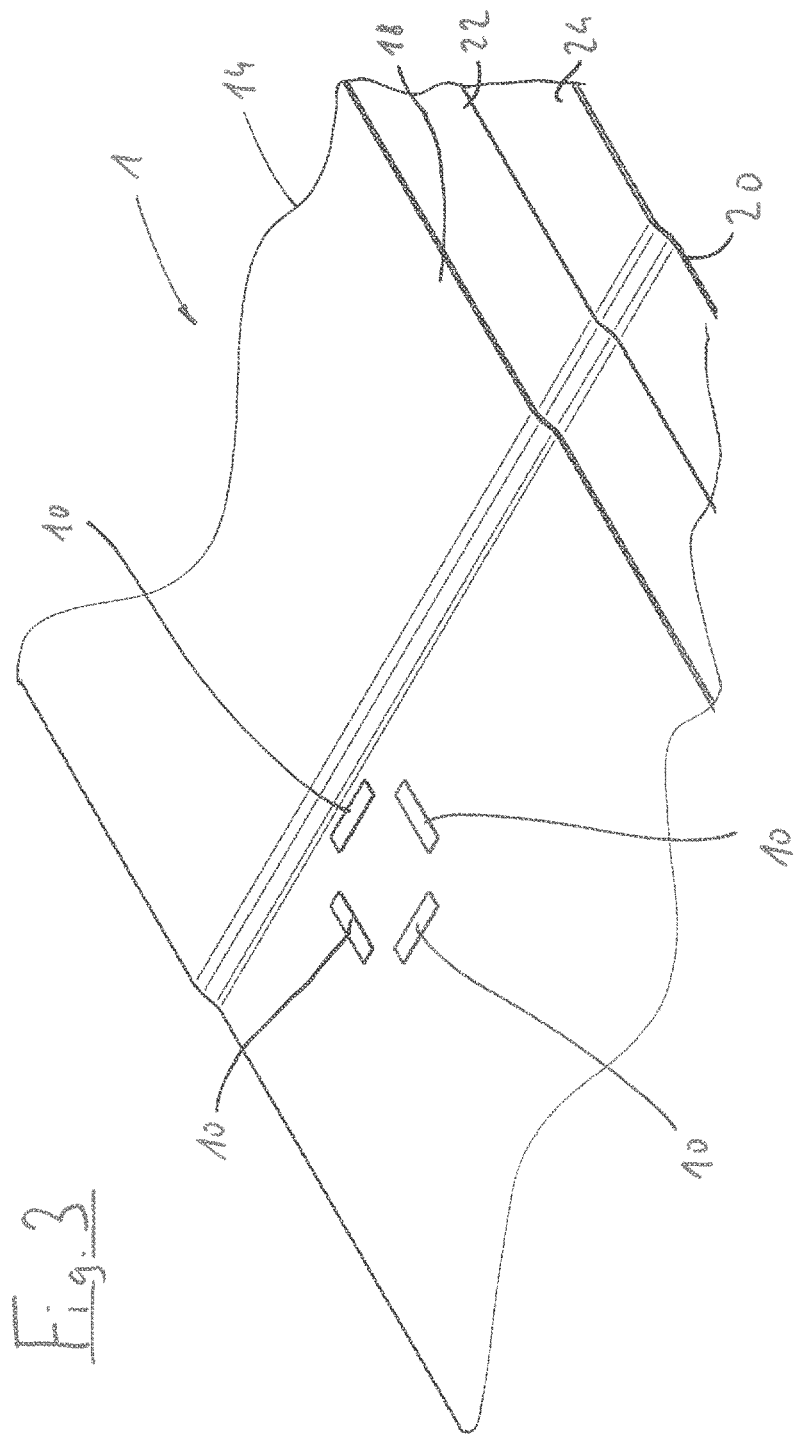

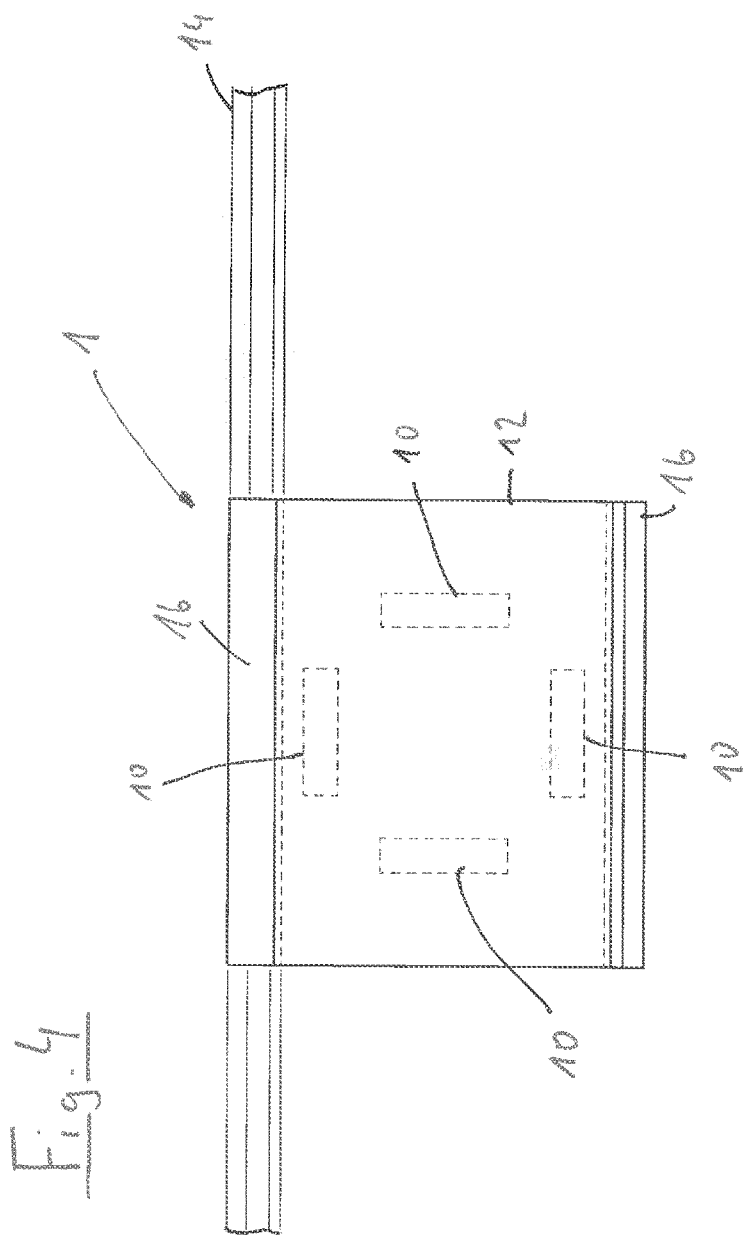

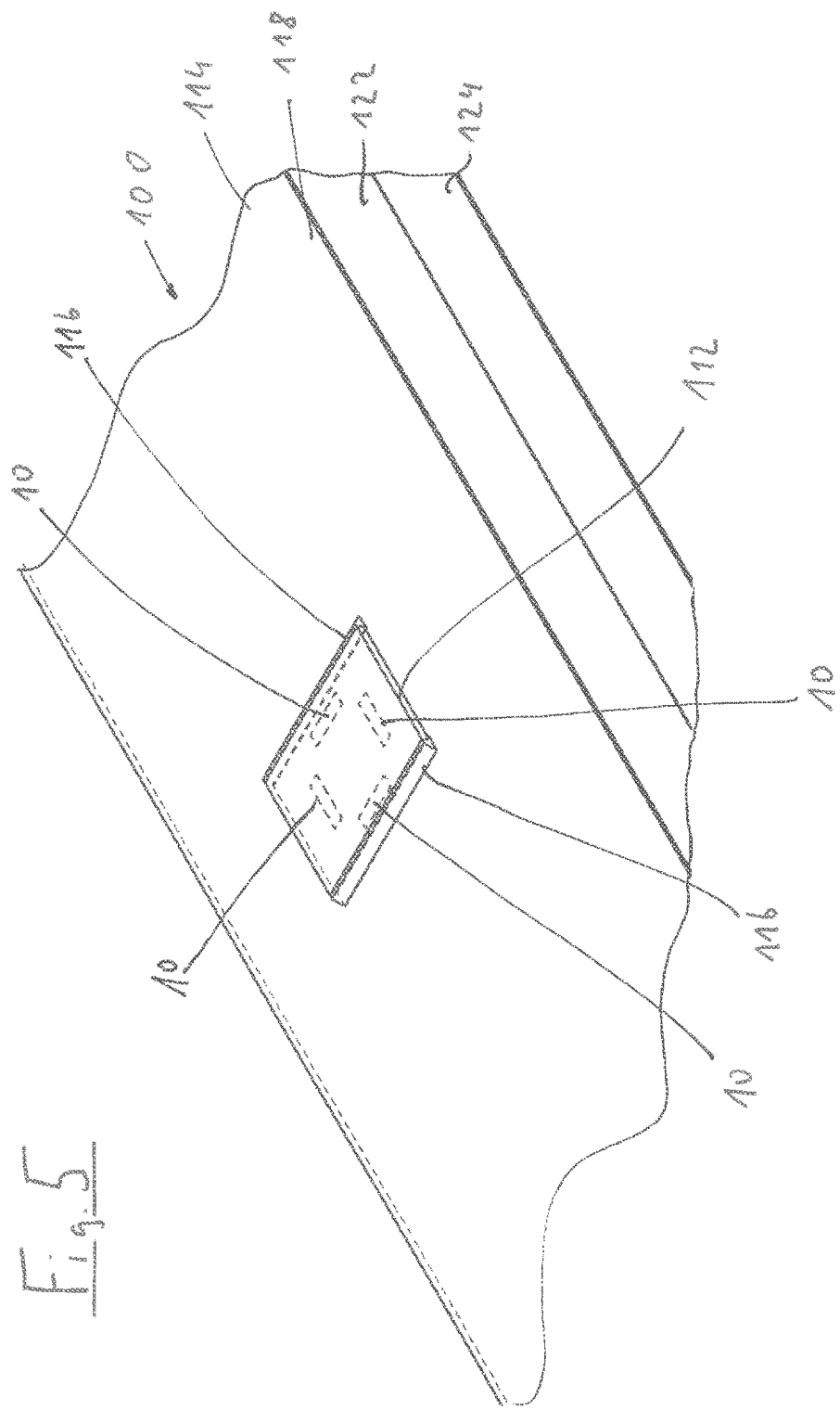

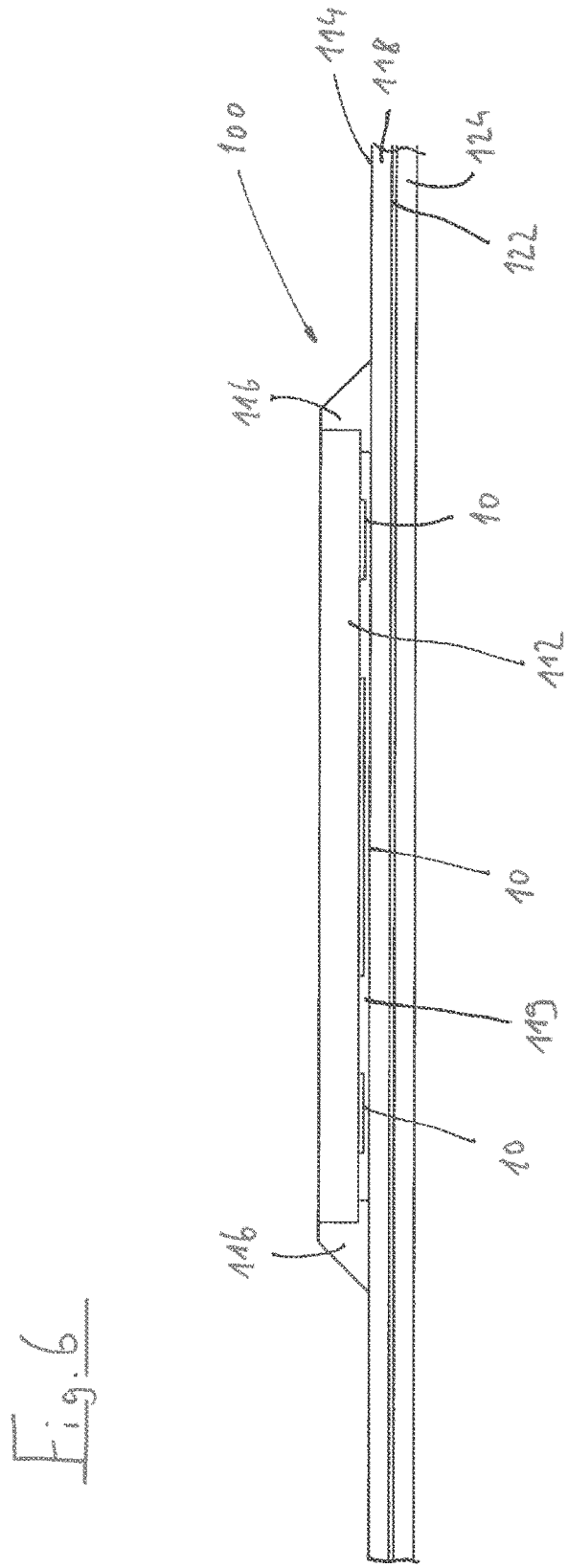

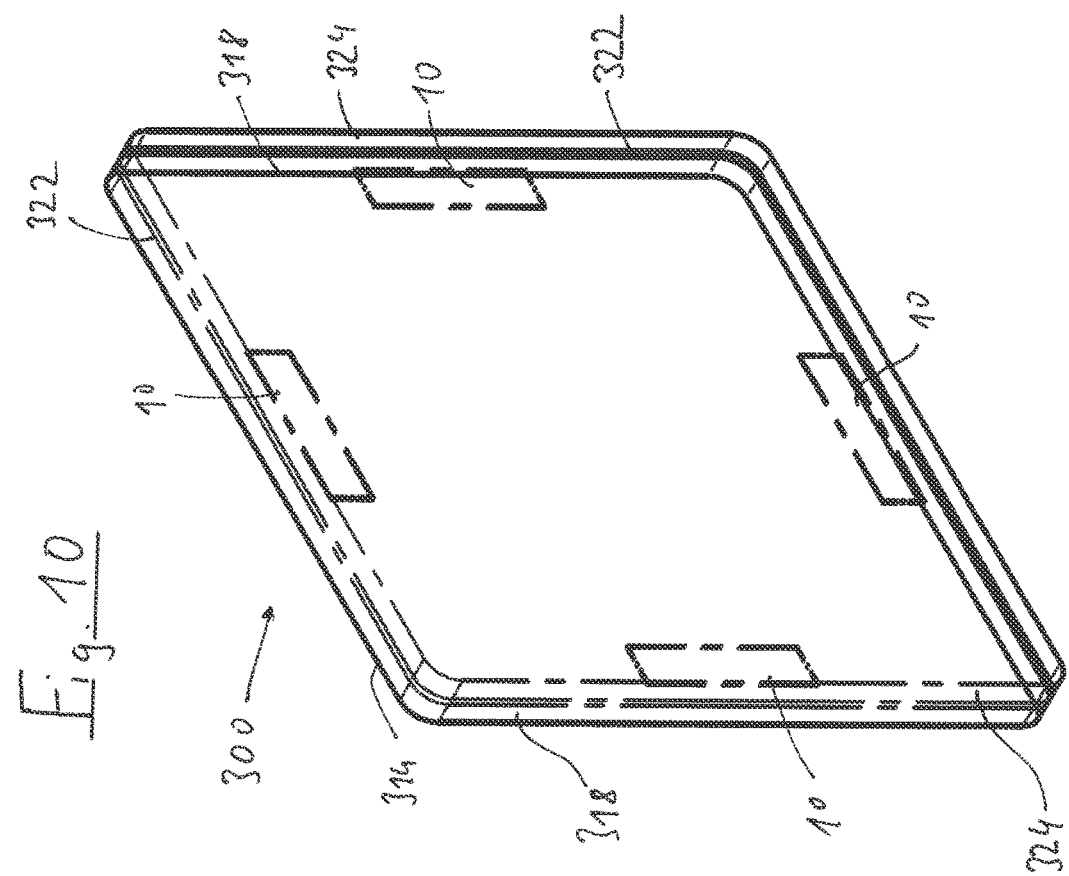
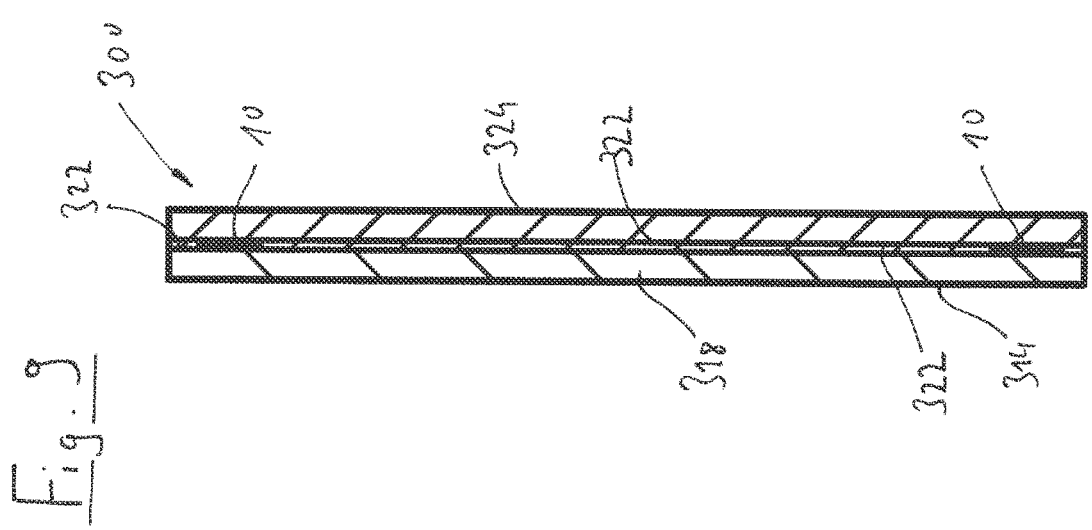

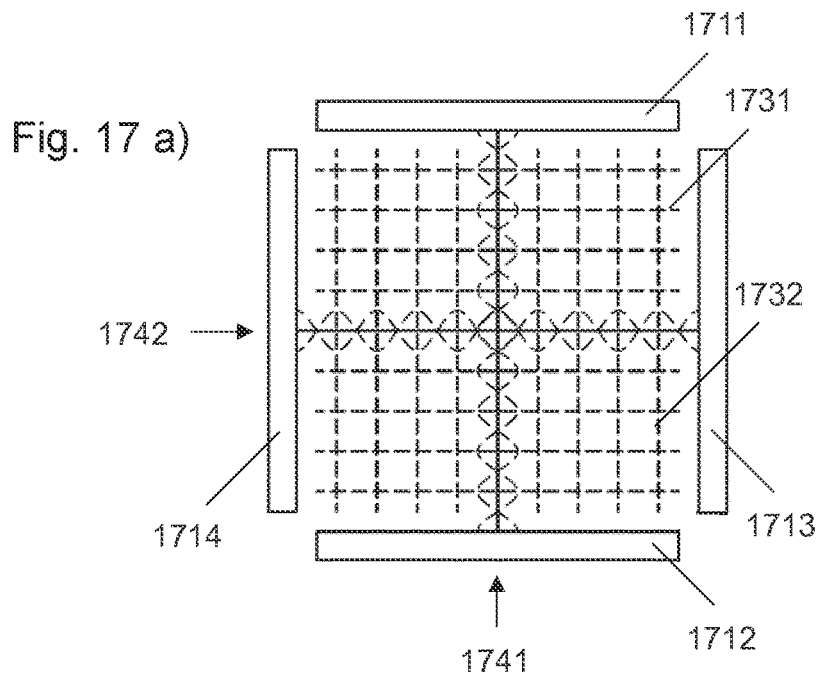
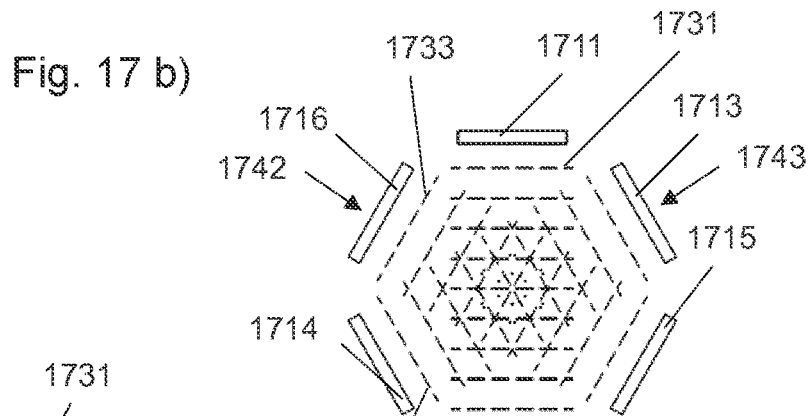
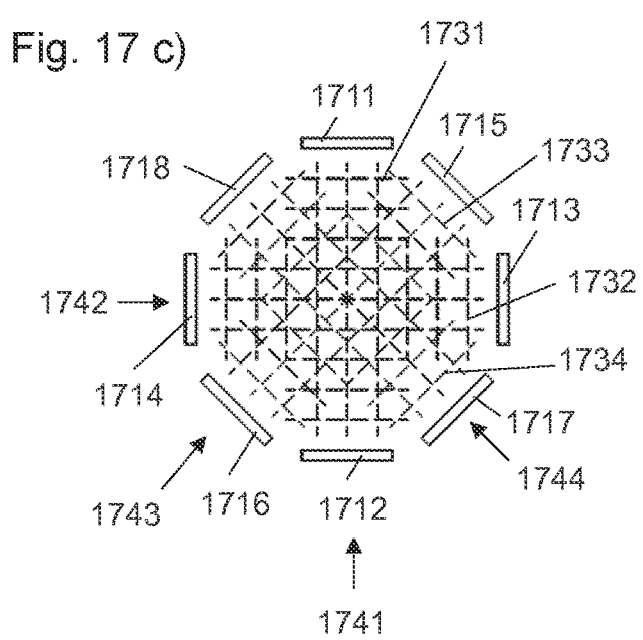

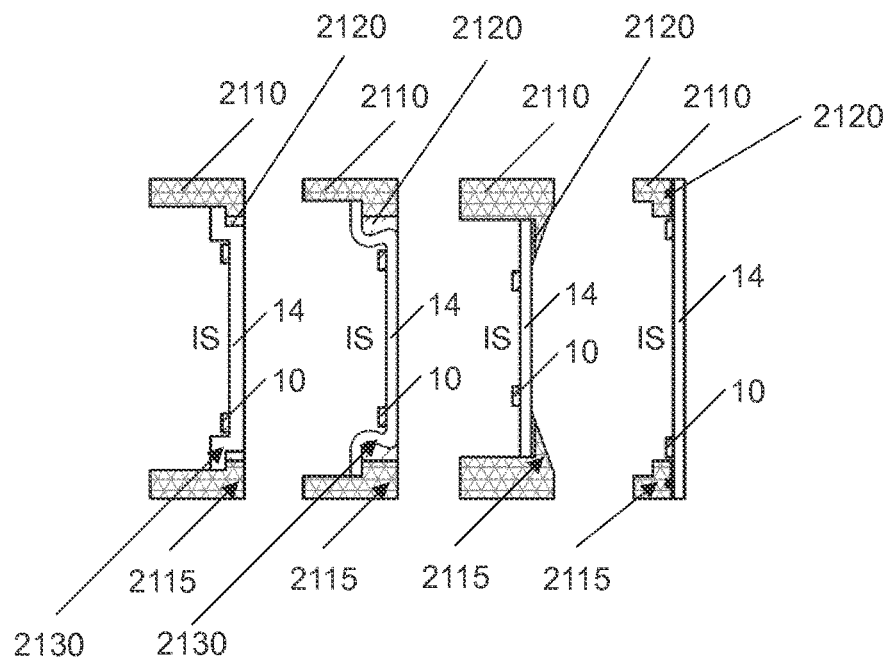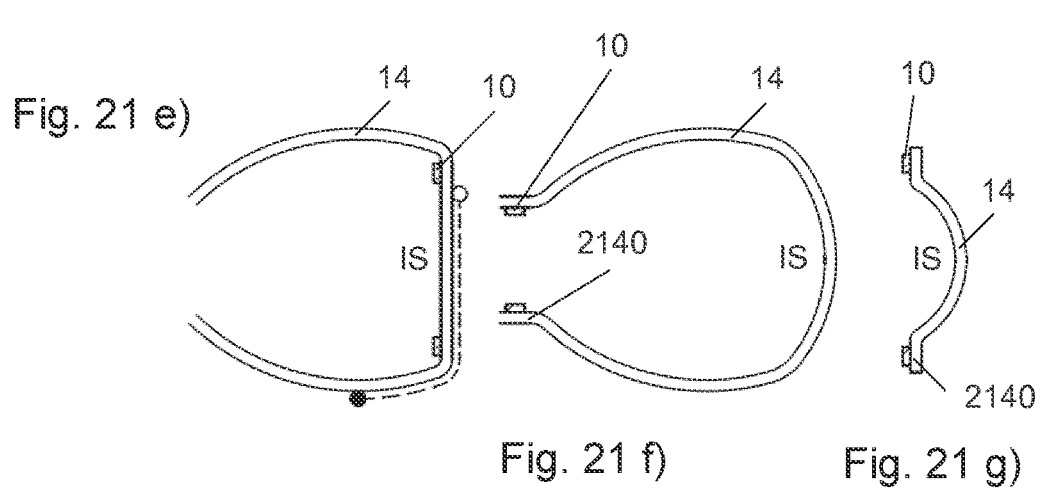

OPTICAL MONITORING DEVICE

RELATED APPLICATIONS

This application is a Continuation of U.S. patent application Ser. No. 16/766,681 filed on May 24, 2020, which is a National Phase of PCT Patent Application No. PCT/EP2018/074942 having International filing date of Sep. 14, 2018, which claims the benefit of priority of German Patent Application No. 10 2017 127 855.9 filed on Nov. 24, 2017. The contents of the above applications are all incorporated by reference as if fully set forth herein in their entirety.

FIELD AND BACKGROUND OF THE INVENTION

According to the preamble of claim 1, the invention relates to an optical monitoring system comprising an optical monitoring apparatus, the visual or scanning field of which is captured by a lens, and a protection panel which protects the lens from precipitation and covers at least the visual or scanning field of the monitoring apparatus.

Optical monitoring apparatuses have very versatile fields of use. Firstly, they can be embodied and used as stationary cameras, for example within the scope of object monitoring or as safety cameras in public spaces, or as cameras in vehicles, the image and/or data signals of which serve to assist the driver or are evaluated by a control system for autonomous movement of the vehicle, which likewise is a subject of the present invention, and converted into control commands for the vehicle. Here, vehicles should be understood to mean land-based craft, watercraft and aircraft, with autonomous driving of motor vehicles currently attracting much attention.

Instead of a camera, other optical monitoring apparatuses may have a laser scanner, an angled mirror (for example embodied as a periscope) or any other optical unit that images an image of the surroundings onto an eyepiece or an optical signal onto a sensor.

Independently of the use, the problem arises that although provision is made of a protection panel for protecting the sensitive lens, said protection panel itself may be impaired in terms of the vision therethrough by precipitation, which is also understood to mean, inter alia, condensation on the glass in addition to rain and snow. In the case of stationary monitoring apparatuses, possibly relevant security information may not be captured or only captured when it is too late. Precipitation also plays a disadvantageous role when monitoring workspaces, e.g. of machine tools, in which use is made of a liquid medium which can precipitate on the protection panel, or in humid surroundings, in which condensation on the protection panel can be expected.

The problem is particularly serious in the case of monitoring apparatuses in vehicles, in which the information has to be evaluated in real time in order to ensure safe control of the vehicle under all circumstances. Since the protection panels of the monitoring apparatuses are particularly exposed to precipitation, or the formation of ice, hoarfrost or condensate, it is indispensable to ensure clear vision, at least in the region of the visual field or of the scanning field of the optical monitoring apparatus, so that the control system can resort to reliable information from the monitoring apparatus at all times.

In the automotive field, the arrangement of front cameras for evaluating the visual field in front of the vehicle behind a protection panel, for example behind a transparent dome on the roof, behind a protection panel assigned to the camera or behind the windscreen of the vehicle, is known. Here, a conventional wiper can also clean the visual field of the camera, with it being possible for difficulties to occur in the case of a partial formation of ice or condensate in the visual field of the camera, which the vehicle occupants do not even perceive when looking through their normal viewing window of the windscreen. Wiper/washing systems are also known in the case of transparent, bell-like covers, in which circumferential wipers clean the bell all the way round, with water being sprayed onto the protective bell for assistance, detergent possibly having been added thereto. The same problem occurs in the case of laser scanners, the scanning field of which likewise must not be impaired by dirt.

SUMMARY OF THE INVENTION

The object of the present invention consists of developing an optical monitoring apparatus, the monitoring function of which is less impaired in the case of precipitation.

The main features of the invention are specified in the characterizing part of claim 1. Configurations are the subject matter of claims 2 to 18. The subject matter of the invention also relates to a control system for controlling vehicles according to claim 19.

According to the invention, an optical monitoring apparatus of the type set forth at the outset is provided with the innovation that the protection panel is acoustically coupled to at least one ultrasonic transducer.

It was found that this arrangement can achieve clear sight through the protection panel particularly quickly since the ultrasonic transducers, which are also referred to as ultrasonic probes, can be efficiently focused onto the visual field or the scanning field of the monitoring apparatus on the protection panel, the size of which may vary depending on the focal length of the camera lens and the distance from the lens of the optical unit of the apparatus. In any case, it is smaller than, e.g., the entire visual field of a windscreen of a vehicle, and so the cleaning effect can be optimized.

In the following, objects to be cleaned, such as panes, laminated glass panes, lenses of optical systems, protection or viewing panels or a different surfaces is combined under the term substrate, with this meaning that the element to be cleaned carries a transducer on its surface; i.e., it is the substrate for the transducer.

Spatial waves and/or surface waves are producible by the transducer. By way of example, spatial waves are longitudinal waves or transverse waves. Longitudinal waves oscillate in the direction of propagation thereof. Transverse waves oscillate transversely to the direction of propagation thereof. By way of example, surface waves arise by spatial waves being refracted at interfaces. The surface waves propagate perpendicular to the oscillation direction thereof along an interface between two acoustically different media. By way of example, Love waves oscillate at the interface in the horizontal direction and propagate perpendicular to the oscillation direction. Rayleigh waves oscillate in the vertical direction in relation to the interface and propagate perpendicular to the oscillation direction along the interface. The surface waves experience strong attenuation in the respective material lying beyond the interface. The sound waves produced by the transducer are preferably ultrasonic waves. Ultrasound is the frequency range lying above the audible frequency range of humans, and starts at approximately 16 kHz.

As a rule, the ultrasonic transducers are embodied as piezo-elements which are able to produce the ultrasound with the desired frequencies.

In a particularly preferred embodiment of the invention, provision is made for the frequency range of the at least one transducer to lie between 0.5 and 5 MHz.

This embodiment renders it possible not only to move the humidity adhering to the protection panel more quickly to the edges of the visual field but also to evaporate said humidity immediately by way of the possible high energy influx.

According to a further embodiment, provision is made for the transducer to comprise a piezoelectric material, in particular lead zirconate titanate (PZT). An advantage arising as a result thereof is that a transducer having a high frequency and power efficiency is producible thus.

According to a development, provision is optionally made for the transducer to comprise at least one electrode on a side facing the substrate or the protection panel. In this way, the energy of the ultrasonic waves emitted by the transducer can be advantageously input coupled into the substrate. As result of a preferred configuration, according to which one the electrodes are embodied in the direct proximity of the surface of the substrate, certain wave types, for example surface waves or spatial waves, can be produced in an advantageous manner.

A further configuration provides for the transducer to comprise at least one electrode group with at least one electrode in each case. In a further configuration, the transducer comprises at least two electrode groups with at least two electrodes in each case. In a further configuration, the transducer comprises at least three electrode groups with at least two electrodes in each case. Grouping electrodes to form electrode groups allows electrodes to be actuated together. As result of this, the outlay when integrating the transducer is reduced. Provided that connections of electrodes to electrode groups are optionally provided on the transducer itself, a further advantage arising is that separate feed lines for the actuation of the transducer are only required for the electrode groups and not for the individual electrodes.

A development optionally provides for the transducer to comprise a first electrode group and a second electrode group, wherein the first electrode group comprises at least two electrodes with a first distance and the second electrode group comprises at least two electrodes with a second distance. As a result of two electrode groups with respective electrode distances being provided, an advantage arising is that different frequencies can be input coupled into the substrate or into the protection panel by means of one transducer.

For embodying purposes, provision can be made for the first electrodes of the first electrode group to have a first dimension in relation to the dimension of the transducer and for the second electrodes of the second electrode group to have a second dimension in relation to the dimension of the transducer, wherein the first dimension deviates from the second dimension. The electrodes, which can optionally be embodied as shapes of the transducer material, can have a length dimension and a width dimension as dimensions. Moreover, the electrodes may have an elevation in relation to the transducer material. An advantage arising herefrom is that the electrodes can be designed in view of the frequencies to be produced by the electrodes or the electrode groups. If a first dimension of the electrodes is chosen for a first electrode group, said dimension differing from the second dimension of the second electrodes of the second electrode group, then different frequencies are advantageously producible by means of the electrode groups. A further advantage here arising herefrom is that, for example, a first frequency and a second frequency are producible by only one transducer, with the first frequency differing from the second frequency in a furthermore advantageous manner, in particular being higher than the second frequency. This can be particularly advantageous if different precipitations or contaminants are present on the substrate, which can be either moved or vaporized by means of different frequencies of the sound waves coupled into the substrate by way of the transducer.

According to a development, provision is made for the first electrode group to be meshed with the second electrode group in a comb-like manner. In particular, an interdigital transducer is provided thereby. An advantage arising from the comb-like meshing is that surface waves are producible in a particularly effective manner by the transducer.

According to a configuration, provision is optionally made for the first electrode group to be arranged in a first region of the transducer and for the second electrode group to be arranged in a second region of the transducer. As result of this, possibly occurring interferences in the produced waves can be attenuated or avoided in an advantageous manner. Therefore, provision is made in a special configuration for the first region and the second region not to overlap. In particular, a region need not be understood to mean a contiguous region. Instead, a region is considered to be an area that is covered by one more electrode groups with the same properties. Thus, what may be the case, for example, is that a first region and a second region are alternately arranged in a longitudinal direction of a transducer.

The invention can be developed in that the transducer has a rectangular form. As an alternative to a rectangular form, the transducer can be L-shaped. A further alternative consists of the transducer being U-shaped. Finally, it may be advantageous in view of the configuration of the form of the transducer if the transducer is circular. A certain transducer form can be advantageous depending on the application. The rectangular or circular configuration of the transducer is advantageous when, in particular, the visual area of the substrate or of the protection panel should not be substantially impaired. Provided the precipitation should not only be vaporized but also be moved, it could be advantageous to configure the transducer to be L-shaped or U-shaped. In this way, the precipitation or the contamination would extend in a preferred direction, which, in particular, extends to where no transducer material is arranged on the substrate or the protection panel.

It is advantageous if the at least one transducer is arranged next to the visual field or scanning field so as not to limit the visual field or the scanning field of the monitoring apparatus. In the case of the arrangement of a plurality of monitoring apparatuses in particular, which may also be a combination of scanners and cameras, this need, however, not always be the case.

In a further preferred embodiment of the invention, provision is made for at least two transducers to be arranged around the visual or scanning field, with it furthermore possibly being expedient if three or more transducers are arranged around the edge of the visual or scanning field in a distributed manner.

By means of these measures, it is possible to influence the distribution of the ultrasonic waves in the protection panel, in particular in the visual or scanning region, in a targeted manner in order to obtain homogeneous cleaning of the protection panel in the visual field or scanning field of the monitoring apparatus.

In addition to the number and position of the transducers on the protection panel, a further option for influencing the distribution of the ultrasonic waves consists of at least two transducers being arranged offset from one another, said transducers radiating same or different ultrasonic frequencies and/or same or different ultrasonic waveforms into the protection panel. The at least two transducers may thus operate at the same frequency or the same waveform. Moreover, differences of a few Hz may be allowable in order to account for alignment inaccuracies and different resonant frequency of the transducer-substrate-system linked with these alignment inaccuracies. Additionally, the same or different frequencies may be stationary frequencies or frequency sweeps. This has the additional advantage, that a range of different types of precipitation is agitated by a single transducer set-up.

In a further configuration of the invention, provision can be made for an edge distance of the transducer to be chosen depending on the work frequency range thereof in such a way that constructive interference occurs in the case of surface waves reflected at an edge of the substrate.

A development optionally provides for the work frequency range of the transducer to be chosen depending on the edge distance thereof in such a way that constructive interference occurs between the surface waves emitted by the transducer and the surface waves reflected at the edge of the substrate.

Optionally, provision is made for a work frequency range of the transducer to be chosen depending on the thickness of the substrate in such a way that constructive interference occurs for spatial waves reflected within the substrate at the edges or interfaces thereof.

For embodying purposes, provision can be made for the substrate thickness to be chosen depending on the work frequency range of the transducer in such a way that constructive interference occurs for spatial waves reflected within the substrate at the edges or interfaces thereof.

Thus, provision is optionally made for an edge distance of the at least one transducer to correspond to a fraction or multiple of the wavelength of the sound waves produced by the at least one transducer.

As result of these developments in respect of the exploitation of constructive interference, the wave energy, which has not yet been transferred into the precipitation for the purposes of vaporizing or moving the latter but which was reflected at the boundary of the substrate or the protection panel, can be advantageously used further without an extinction by way of not yet reflected oscillations occurring.

According to a development, provision can be made for the transducer to be arranged in an interstice between two substrates.

Also, provision is optionally made for the transducer to be arranged on a side of the substrate distant from the precipitation.

These advantageous configurations ensure that the transducer does not come into contact with the precipitation. What furthermore advantageously arises herefrom is that, in the case of such a configuration, the requirements for sealing and protecting the transducer itself from the precipitation are lower or do not exist at all.

In an optional development, it may likewise be expedient for the transducer to be arranged on a side of the substrate facing the precipitation.

According to a development of the invention, provision is made for the transducer to be arranged within a substrate.

In a configuration of the invention, provision can be made for the transducer to be arranged within a layer of a multi-ply substrate.

An advantage arising from these configurations is that surface waves can be directly input coupled into the substrate or the protection panel by the transducer, said surface waves propagating on the surface of the substrate or of the protection panel to be cleaned. Consequently, possible scattering and losses, for instance by dispersion in the interior of the substrate, are avoided.

A development provides for the substrate to have a thickness recess, in which the transducer is at least partly inserted. Consequently, a low installation height is achieved in an advantageous manner.

According to a configuration, it is optionally possible for at least two transducers to be grouped into at least one transducer group in each case.

The invention can be developed by virtue of the transducers of the at least one transducer group corresponding to one another by virtue of being actuated together and/or being aligned in a corresponding geometry, for instance spaced apart, but being substantially centered in relation to one another.

As a result of the provision of a transducer group made of at least two transducers, these can interact such that, for example, constructive interference or standing waves are producible between two spaced-apart transducers of a transducer group.

What optionally arises in accordance with one development is that at least two transducer groups are actuatable. Optionally, provision is made for the at least two transducers to have an identical embodiment. In a further configuration, provision is made for at least two, three or four transducer groups to be arranged in such a way that the transducers form a ring-shaped structure, i.e., are arranged along a ring-shaped structure in the circumferential direction.

This is advantageous since this renders an extensive, grid-like structure of standing waves producible, said structure being modifiable by the modulation of the sound waves emitted by the transducers.

A further measure for influencing the amplitudes of the ultrasonic waves in the protection panel in a targeted manner may consist of the protection panel having internal structures for deflecting and/or damping the introduced ultrasonic waves. These structures may be omissions, interfaces or fillings made of a material with stronger or less strong damping properties.

Even though it is technically possible, in principle, to couple the at least one transducer onto the protection panel on the surface which should be protected from wetness and moisture, it is preferable for the at least one transducer to be connected from the side of the optical unit of the monitoring apparatus with the surface of the protection panel found there. There, said transducer is better protected from solar irradiation and wetness, and the electrical connection is also embodied more easily.

According to a further configuration, provision can be made for the at least one transducer to be actuated with a frequency-modulated signal in a first mode. Optionally, the frequency-modulated signal can have a time varying modulation (sweep). As a result of the frequency modulation, inaccuracies in the arrangement of the individual components acoustically involved in the cleaning process (e.g., the transducer, the substrate or the protection panel, a possible connecting layer, cabling, etc.) and in the configuration of the individual components can be compensated for.

Optionally, the invention can be developed by virtue of the transducer being actuated by an amplitude-modulated signal in a second mode. For development purposes, the amplitude-modulated signal can have a time varying modulation (sweep). As a result of the amplitude modulation, the front of the maximum wave energy is displaced in space, as a result of which the cleaning power of the system is advantageously increased.

What may optionally arise in a further configuration is that the transducer is actuated with a phase-modulated signal in a third mode. For development purposes, the phase-modulated signal can have a time varying modulation (sweep). As a result of the phase modulation, wave maxima of standing waves, which form between two transducer groups, are advantageously moved back and forth in a direction formed between the transducer groups.

According to a development, provision can be made for the mode to be changeable in sequence. In this way, it is advantageously possible for the system to be adaptable to different types of contamination.

In a configuration, provision is made for an actuation circuit to have a linear amplifier. The invention can be developed by virtue of an input signal for the linear amplifier being a summed signal from individual signals of different frequencies. In accordance with one configuration, provision is made for at least one of frequency filter to be disposed downstream of the linear amplifier. A development provides for at least one transducer to comprise an electrode configuration that is excitable in a frequency-dependent manner.

An advantage arising from the configurations specified above is that only one amplifier is required for the actuation of different transducers with different frequency ranges. As a result, the overall system becomes more compact and efficient.

What arises optionally according to one configuration is that the actuation circuit comprises a nonlinear amplifier. This is advantageous in that a nonlinear amplifier produces harmonics. These harmonics can be used in addition to the carrier signal for the actuation of a further transducer or a further electrode group of the same transducer without further hardware being necessary. As a result, the design of the apparatus is simplified and production is made easier.

According to a further configuration, provision is made for the apparatus to have a temperature management system. What can arise according to a development is that the temperature management system monitors the temperature of the apparatus, in particular of the transducer and/or of the substrate. What arises optionally according to one configuration is that the temperature management system regulates the power uptake of the transducer depending on the temperature. What can arise according to one configuration is that the temperature management system has a temperature-dependent circuit breaker. Optionally, for development purposes, provision is made for the circuit breaker to be resettable.

The temperature management system according to the preceding configurations is advantageous in that overheating of individual components of the apparatus is recognizable and avoidable. In this way, damage or functional impairment of the components—for example, as a result of an elevated energy supply—is avoided. By way of example, a certain temperature range can be provided for the transducer material, a possibly present connecting layer and/or the substrate or the protection panel, within which temperature range a function of the component or certain properties can be ensured.

According to development, provision can be made for the circuit breaker not to be resettable. What this consequently achieves in an advantageous manner is that a circuit for supplying the transducer is not inadvertently closed again, possibly causing the transducer to overheat.

An optional configuration provides for the circuit breaker to have a control signal output. What may arise according to a development is that a generator or an amplifier for the signal of the transducer is actuatable by a control signal of the circuit breaker. In a further configuration, provision can be made for the control signal to be guidable to the temperature management system. Consequently, an advantage provided here is that the apparatus is switchable by the control signal depending on the switching state of the circuit breaker. This ensures that the temperature increase above the switching threshold of the circuit breaker is avoided in another way. This is accompanied by the advantage that the safety of the apparatus is further increased.

For embodiment purposes, provision can be made for the circuit breaker to have good thermal contact with the transducer and the substrate.

In the development of the invention, provision is made for the temperature management system to comprise a temperature sensor. The invention can be configured in that the temperature sensor has good thermal contact with the transducer and the substrate. In a development, provision can be made for sensor data of the temperature sensor to be usable for controlling the signal for the at least one transducer. The invention can be developed in that the signal for the at least one transducer can be regulated in view of amplitude, frequency or pulse width, depending on the sensor data. An NTC thermistor, a PTC thermistor, a thermistor, a diode, a thermocouple or any other suitable means for determining the temperature can be used as a temperature sensor.

An advantage arising from the aforementioned configurations of the invention with a temperature sensor is that it is possible both to detect a maximum temperature being exceeded and to determine the temperature curve, for example depending on the power supplied to the transducer. Consequently, the system is advantageously regulable without a switching threshold after reaching a limit temperature being exceeded and the system being completely deactivated.

As an aside, it should be noted that the transducers are acoustically coupled to the protection panel in a manner known per se in this case, for example by adhesive bonding using an epoxy resin that is very hard after curing, said epoxy resin facilitating a good transfer and introduction of the ultrasound into the protection panel.

In a development of the invention, provision is optionally made for the at least one transducer to be captively connected to the substrate or the protection panel by way of a connecting layer, with the connecting layer being arranged between the substrate or the protection panel and the transducer and the connecting layer having a connecting material and filler material.

In a development of the invention, the connecting layer is a layer that cohesively connects the transducer to the substrate or the protection panel. Optionally, this can be provided by an adhesive layer. Optionally, the connecting material ensures the adhesion of the transducer on the substrate or the protection panel and said connecting material has material-specific mechanical and acoustic connecting material properties. Optionally, the filler material may likewise contribute to adhesion but, moreover, it can define a distance between the substrate or the protection panel and the transducer. The filler material likewise has material-specific mechanical and acoustic filler material properties. In a development of the invention, provision is made for the connecting layer to connect the transducer, the substrate or the protection panel and/or the filler material to one another, in particular connect these to one another in cohesive fashion, wherein, provision is made in a more detailed configuration of the invention for the connecting layer to be substantially gas-free.

An advantage arising as a result of providing a connecting layer made of a connecting material and filler material is that the connecting layer can be influenced, both in respect of its mechanical properties, i.e., for example, density, hardness or viscosity, and in respect of its acoustic properties, such as sound propagation speed, for example, by selecting the material composition thereof. In this way, it is possible to set acoustic impedance differences or acoustic impedance contrasts between the respective field impedance of a material of the transducer and of a material of the substrate or the protection panel. As a result, it is advantageously possible to influence whether, and to what extent, there is a reflection of the sound energy at an interface between the transducer and the connecting layer and between the connecting layer and the substrate or the protection panel. Moreover, a further advantage is provided by virtue of the transducer being precisely alignable to the substrate, in particular by way of the selection of the filler material, which can provide mechanical stability to the connecting layer. A precise alignment of the transducer in relation to the substrate or the protection panel is advantageous in that the sound waves produced by the transducer are input coupled into the substrate or into the protection panel in an optimal manner and said sound waves propagate there in a defined manner.

A particularly preferred embodiment of the invention provides for the filler material to establish a defined distance between the transducer and the substrate or the protection panel. The distance defined by the filler material is advantageous, in particular in view of coupling the transducer to the substrate or to the protection panel and for the alignment of the transducer relative to the surface of the substrate or the protection panel.

In a more detailed configuration of the invention, provision can be made for at least one molded body forming an acoustic bridge from the filler material by way of a coupling with the transducer and the substrate or with the protection panel. According to a development of the invention, provision is made for the at least one molded body to be a solid, preferably solid throughout. The invention can also be developed in that the at least one solid has a dimension corresponding to the distance. Consequently, from a mechanical point of view, a distance between the transducer and the substrate or the protection panel is fixedly and uniquely defined by the filler material in an advantageous manner. The at least one molded body can form a matrix comprising the filler material in the connecting material. A further advantage arising as a result of acoustically coupling the transducer with the substrate or with the protection panel by way of the acoustic bridge of the filler material, i.e., the direct material contact between the connecting material and the transducer and the substrate or the protection panel, is that, inter alia, the acoustic properties of the connecting layer can be influenced thereby. In this way, it is possible to additionally advantageously influence the impedance contrasts between transducer and connecting layer and between connecting layer and the substrate or the protection panel.

A development of the invention provides for the at least one molded body to be spherical or rod-shaped. According to a development of the invention, provision is made for the diameter of the at least one spherical or rod-shaped molded body to correspond to a fraction of the operating frequency of the transducer. For configuration purposes, provision can be made for the diameter of the at least one spherical or rod-shaped molded body to be between 1 and 1000 μm, preferably between 1 and 100 μm and particularly preferably between 30 and 50 μm. A development optionally provides for the at least one rod-shaped molded body to be arranged in a lying or standing manner. What advantageously arises from the spherical or rod-shaped configuration of the at least one molded body is that the molded body or bodies can be distributed well in the connecting material and are always present in a defined position in the connecting material, which has a positive influence on the transmission of the sound waves from the transducer to the substrate or to the protection panel.

As already indicated, a particularly preferred embodiment of the invention provides for the protection panel to be integrated into a protection panel of a vehicle or arranged on the protection panel from the outside. This solution is ideal, for example for front cameras in motor vehicles, since the already known camera positions in the region of the conventional rearview mirror, from where an ideal visual field for the camera arises, can be maintained.

By way of example, the integration into the protection panel can be implemented in such a way that the protection panel then embodied as an additional protection panel forms the outer panel (outer glass layer) of a laminated glass panel. Nevertheless, even in that case, the sensors preferably do not lie at the edge of the entire protection panel but instead lie around the edge region of the visual field of the camera, which only makes up a fraction of the overall area. The laminated glass panel can be any panel in a vehicle, such as a rear window, or another protection screen, as is used as a visual window in machine tools, for example. Furthermore, the protection panel can be provided solely for the purposes of protecting a camera lens or the optical unit of a scanner.

In a particularly expedient embodiment of the invention, provision is made for the at least one transducer to be arranged between the layers of a laminated glass panel. This arrangement requires no additional space and, in particular, it is possible to maintain the original dimensions of a protection panel that is already known in principle. The transducers are adhesively bonded to the outer panel of the laminated glass panel before the two layers are connected by means of the laminate layer lying therebetween.

In a first embodiment with transducers integrated into a laminated glass panel, provision is made for the at least one transducer to be embedded in the laminated layer of the laminated glass panel. Here, a particularly simple production arises, with, in principle, adopted parts of a conventional laminated glass panel.

For reasons of signal damping, it may be advantageous if the laminated layer and/or the inner panel of the laminated glass panel is omitted in the region of the visual or scanning field of the monitoring apparatus and/or of the at least one transducer. The omission of the laminate layer means that the transducers and the region of the visual or scanning field are not dampened by the laminate material, and so a higher level of efficiency can emerge. Here, the transducers either lie in a cavity between the two panes or lie in the open, if the inner panel is also omitted in this region.

Should the additional protection panel then not be an integral component part of a protection panel, it is preferable for the additional protection panel to be applied using an adhesive on the outside, i.e. on the side on which the precipitation is to be expected, on this protection panel, regardless of its condition.

The application on the outside is preferably effectuated in such a way that a cavity, in which the at least one transducer is arranged, is provided between the additional protection panel and the actual protection panel. The cavity avoids damping effects, which could impair the cleaning action.

Depending on the requirements, it may be advantageous if the additional protection panel is arranged in a depression or cut-out of the actual protection panel such that the outer side of the protection panel terminates flush with the outer side of the additional protection panel of the camera or any other optical apparatus. Such an arrangement can be particularly advantageous, for example, if, in accordance with a preferred development of the invention, a wiper is provided, the wiping field of which only covers the visual or scanning field of the monitoring apparatus, a protection panel of a vehicle including the visual or scanning field of the monitoring apparatus, or only the protection panel of the vehicle, without the visual or scanning region of the monitoring apparatus.

However, the preferably provided wiper, which may have one or more wiper arms with wiper blades, may also only cover a wiping field which is restricted to the visual or scanning field of the monitoring apparatus or which leaves out the visual or scanning field of the monitoring apparatus.

The respective concept may depend on the field of use, the type of introduced ultrasonic waves and optionally further considerations. In certain circumstances, a visual field that was additionally cleaned by a wiper offers an improved cleaning action in the case of dirtying which contains little or no water, particularly if a wiper water apparatus is used. However, also cleaning the visual or scanning field of the monitoring apparatus with a wiper may also be deliberately dispensed with, for example because the visual or scanning field is also covered by the wipers gliding past, at least for a short period of time, during which no signal evaluation can take place.

A further particularly advantageous measure provides for the protection panel to consist of a transparent ceramic material. As a rule, ceramic material is harder than glass and offers particularly expedient properties for the introduction and propagation of the ultrasonic waves under minimal damping. Moreover, it offers a longer service life under mechanical stress, e.g. in the case of stone chips in the case of vehicles, since the surface quality is less afflicted by the particles striking at a high-speed. This embodiment is particularly suitable for solutions in which the additional protection panel is applied to a present windscreen or any other protection panel partially in the region of the visual field of the camera. The embodiment with a separate ceramic ply is particularly preferred and can be adapted to all types of protection panels if a ceramic ply is provided at least in the region of the visual or scanning field of the monitoring apparatus, independently of whether the ceramic ply is part of the protection panel or adhesively bonded thereto from the outside. The great endurance of the ceramic material is also advantageous in that the surface is less sensitive to wear in the case of an additional use of mechanical wiper systems. The ceramic material can also be applied directly onto the surface of the lens, the lens of the optical monitoring apparatus then itself forming the protection panel.

The subject matter of the present invention also relates to a control system for autonomous driving of motor vehicles, in which one or more monitoring systems according to any one, or different, claims of claims 1 to 18 are provided.

BRIEF DESCRIPTION OF THE SEVERAL VIEWS OF THE DRAWINGS

Further features, details and advantages of the invention emerge from the phrasing of the claims and from the following description of exemplary embodiments on the basis of the drawings. In detail:

FIG. 1 shows a cross section of a laminated glass with an additional protection panel applied thereon;

FIG. 2 shows an oblique view onto the laminated glass according to FIG. 1, with elucidated layers of the laminated glass;

FIG. 3 shows a plan view of the additional protection panel according to FIG. 1;

FIG. 4 shows an oblique view onto the laminated glass according to FIG. 1, without the additional protection panel;

FIG. 5 shows a cross section of a plane laminated glass with an additional protection panel arranged thereon;

FIG. 6 shows an oblique view onto the laminated glass according to FIG. 5;

FIG. 9 shows a cross section of a further laminated glass with transducers integrated between the panes;

FIG. 10 shows an oblique view onto the laminated glass according to FIG. 9;

FIGS. 17a), 17b and 17c) show three further schematic illustrations of at least two transducer groups for producing standing waves in the protection panel of the monitoring system;

FIGS. 21a), 21b), 21c), 21d), 21e), 21f) and 21g) show schematic sectional illustrations of a protection panel of the monitoring apparatus with transducers arranged thereon.

DESCRIPTION OF SPECIFIC EMBODIMENTS OF THE INVENTION

Figure 8:
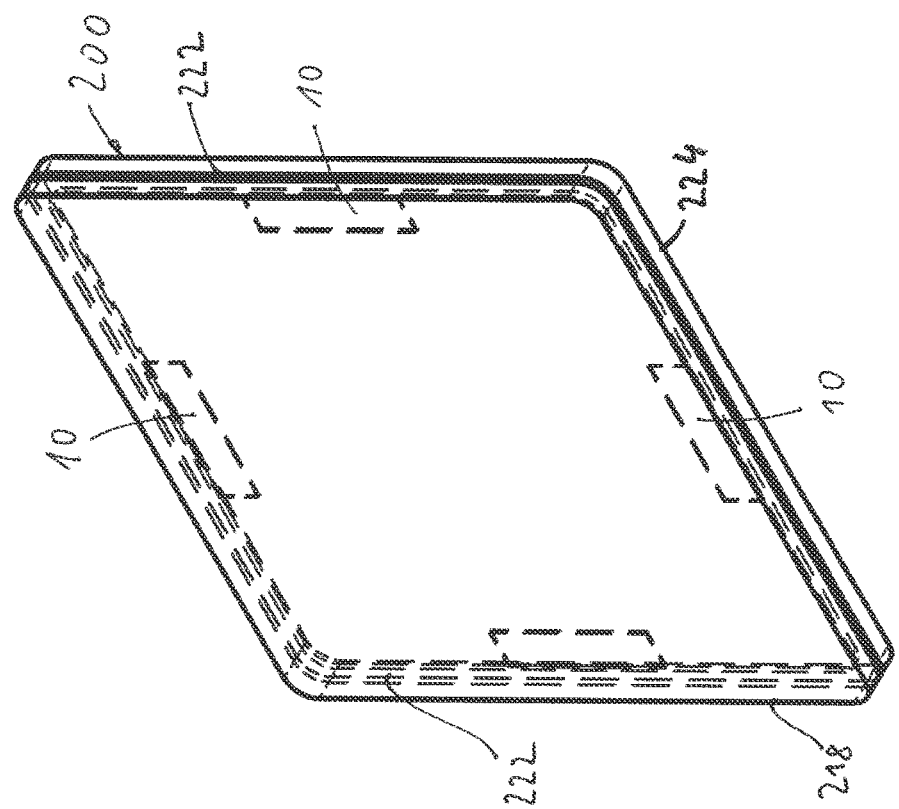
FIG. 8 shows an oblique view onto the laminated glass according to FIG. 7.

The embodiments of monitoring systems described below each have cameras or other optical devices with lenses and protection panels assigned thereto, not illustrated in the drawings, which may be configured in various embodiments. Identical or similar elements are denoted by the same reference signs in the following figures. The protection panels are either additionally applied onto (see FIGS. 1 to 6) or integrated into protection panels, embodied here as laminated glass panes, for e.g. the use in motor vehicles. Embodiments in which the protection panel is specifically adapted to protect a camera and, for example, embodied as a transparent bell or as a transparent termination of a camera housing are particularly expedient. The cross sections of all these protection panels which are shaped completely differently and possibly strongly curved may be substantially the same in terms of the construction. In all illustrated exemplary embodiments, the visual field of the camera is restricted to a region between transducers 10 which introduce ultrasound into the protection panel in a targeted manner in order to free the visual field of the camera from precipitation, which, in addition to rain, should also be understood to mean, inter alia, ice, hoarfrost and condensate. The preferred frequency range of the introduced ultrasound lies in a range of between 0.5 and 5 MHz, with it not being necessary for all transducers respectively provided in a camera system to emit at the same frequency.

FIG. 1 shows a first embodiment of a camera system 1 having an additional protection panel 12, which is applied with the aid of a glass adhesive 16 to the outer side that is exposed to the elements on an additional protection panel 14 made of laminated glass. Here, the additional protection panel 12 consists of a ceramic material and lies at a distance from an outer glass layer 18 of the laminated glass such that a cavity 19 remains between said outer glass layer and the additional protection panel 12. Four transducers 10 are arranged in said cavity around a visual field of the camera in a ring-shaped manner, the camera being arranged on the opposite side on the inner side of the laminated glass of the additional protection panel 12. On account of its hardness, the ceramic material has a particular resistivity against surface wear, and so the through-vision for the camera is retained for longer and the visual field is less sensitive to stone chips and the like.

The peculiarity of the protection panel 14 illustrated in sections in FIGS. 1 to 4 consists of the additional protection panel 12 being arranged in a recess 20 arranged in the edge region of the protection panel. As a result, it is possible for the additional protection panel, with its outer surface, to terminate flush with the outer surface of the protection panel. In this way, it is possible to select a different material (in this case a harder material) for the additional protection panel 12 than for the protection panel 14 itself and to clean both surfaces with a common wiper which assists the cleaning effect of the ultrasonic transducers 10 in the region of the protection panel 12. For the case where a wiper is provided, the wiping field of which also covers the protection panel 12. Ideally, the recess is adapted to the form of the protection panel.

For elucidation purposes, FIGS. 2 to 4 show views of a simple variant, in which the protection panel adjoins flush to the higher region. Here, the arrangement of the four transducers 10 around the visual field of the camera can easily be identified. The transducers 10 can emit ultrasonic waves with different frequencies and waveforms. Provision can also be made of a deviating number of transducers which are arranged to the side of the visual field.

In FIG. 2, it is furthermore possible to identify the construction of the protection panel 14, which, as a laminated glass, has the aforementioned outer glass layer 18, an inner glass layer 22 and a laminated layer 24 lying between the glass layers, as is conventional.

FIG. 3 shows a plan view, while the additional protection panel has been omitted in the illustration of FIG. 4 in order to show the transducers 10 better. Equally, the transducers are not fastened and acoustically coupled to the outer face of the protection panel 14 but, instead, to the inner face of the protection panel 12.

FIGS. 5 and 6 show a further camera system 100, in which a protection panel 114 made of laminated glass, said protection panel, in principle, being conventional, is provided with an additional protection panel 112 in the region of the visual field of the camera (not shown here), said additional protection panel 112 once again being applied to the outer face of the outer glass layer 118 by means of a glass adhesive 116. Once again, provision is made of a cavity 119 between the additional protection panel 112 and the surface of the protection panel 114. the transducers 10 that are acoustically coupled to the inner surface of the protection panel 112 being arranged in said cavity. Since the additional protection panel in this solution protrudes over the outer face of the protection panel, it is not possible to clean the outer face of the additional protection panel 112 with the wiper of the protection panel, and so the additional protection panel 112 is arranged outside the wiping field and the precipitation is only removed by means of ultrasound.

Figure 7:
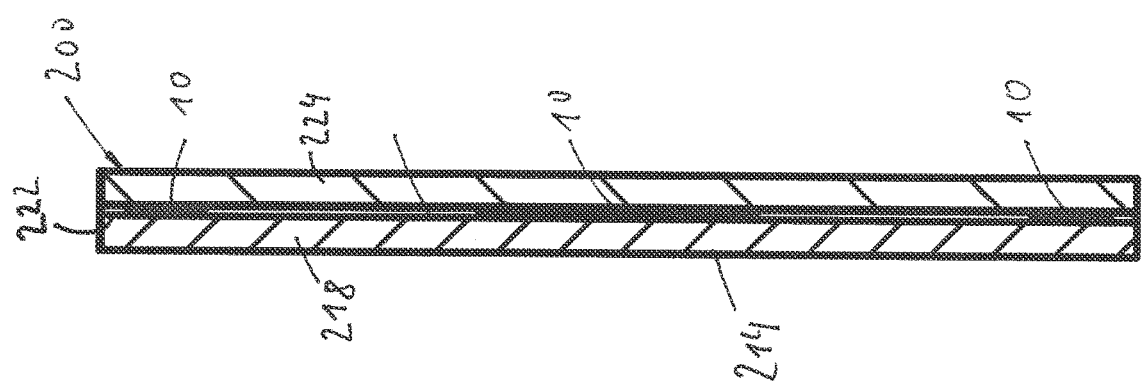
FIG. 7 shows a cross section of a further embodiment with a cavity of a laminated glass, provided in the region of transducers.

FIGS. 7 and 8 show an embodiment of a camera system 200 in which, in an additional protection panel 214 made of laminated glass, the laminated layer 224 is omitted in the region of the visual field of the camera, while the outer glass layer 218 immediately has the function of the previously separate additional protection panel for the camera system 200. Once again, the four piezo-transducers 10 restrict the visual field of the camera to the side, wherein use can optionally also be made of a carrier structure 226 in an omitted region of the inner glass layer, said carrier structure being able to hold the electrical connections for the transducers and being able to serve as a receptacle for the camera as well.

The construction of the protection panel 214 is easily identifiable in FIG. 8. A segment in which the four transducers 10 arranged around the visual field of the camera has been removed from the laminated layer 224 between the inner glass layer 222 and the outer glass layer; however, said four transducers directly acoustically coupled to the outer glass layer 218 of the protection panel. The arrangement of the transducers 10, the ultrasonic frequencies and ultrasonic waveforms is set in such a way that the ultrasonic amplitudes are particularly large, particularly in the visual field of the camera, in order to bring about an ideal removal of moisture there. Optionally, structures which promote the targeted propagation of the ultrasonic waves may also be provided in the outer glass layer 218.

The protection panel 214 embodied as a laminated glass panel may also extend significantly beyond the visual field of the camera to the sides such that the shown protection panel region with the transducers only forms a partial field of the entire protection panel. In this embodiment, the wiping field of the wipers can cover the visual field of the camera as well without problems, provided that this is desired.

Finally, FIGS. 9 and 10 present an even further embodiment of a camera system 300, in which the transducers 10 are embedded in the laminate layer 324 of a protection panel 314 made of laminated glass. Here, the heights of the transducers 10 are matched to the thickness of the laminated layer 324. Incidentally, here too, the visual field of the camera lies in the zone between the transducers 10, which in turn are acoustically coupled to the outer glass layer 318 of the protection panel. Naturally, it is readily possible, here too, to additionally clean the visual field of the camera with possibly present wipers. If the glass layers and also the laminate layer as a visual window extend even further, and so the visual field of the camera, once again, only makes up a small part of a larger panel. Here too, structures in the outer glass layer 318 may help to focus the ultrasound onto the visual field of the camera, provided this is considered necessary.

Figure 11:
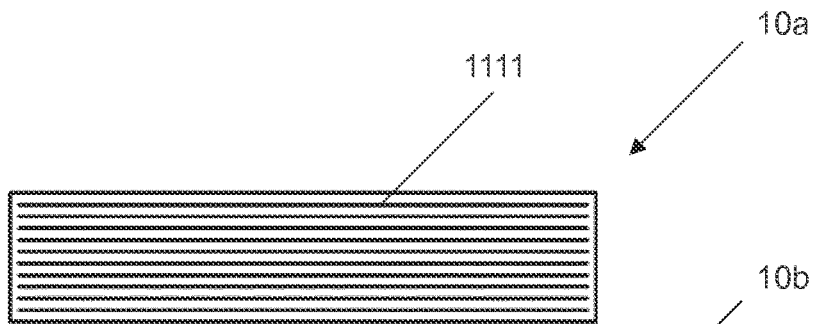
FIGS. 11a), 11b), 11c) and 11d) show schematic illustrations of four embodiments of the transducer of the monitoring system.
Figure 11:
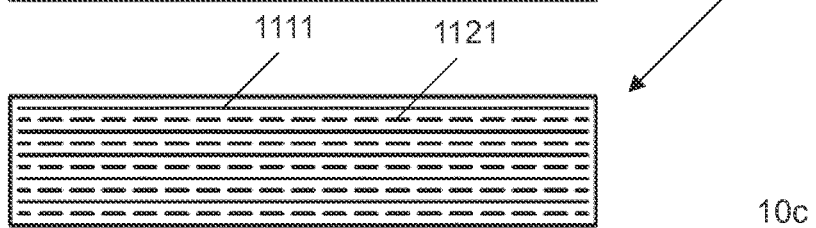
Figure 11:
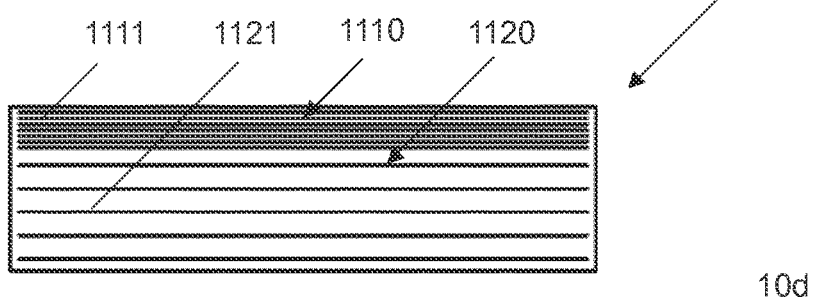
Figure 11:
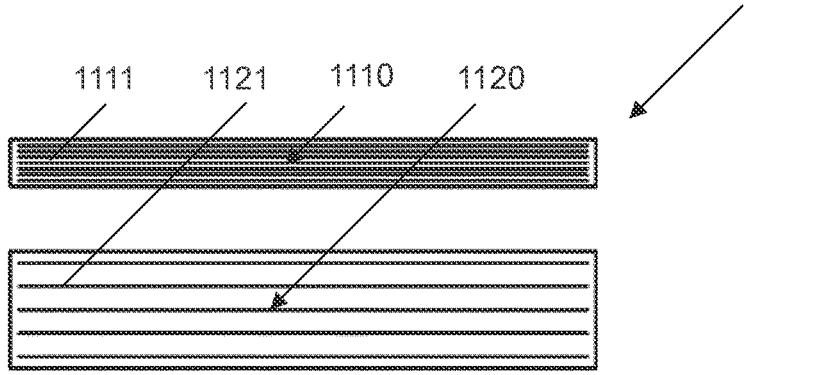

FIGS. 11 a) to d) schematically show the transducer 10 in four different embodiments 10a, 10b, 10c and 10d.

The transducer 10a from FIG. 11 a) has regularly spaced apart electrodes 1111.

The transducer 10b from FIG. 11 b) has at least one first electrode 1111 and at least one second electrode 1121. The first electrodes 1111 and the second electrodes 1121 are arranged alternately in the embodiment 10b of the transducer 10 according to FIG. 11 b). The second electrodes 1121 have a discontinuous embodiment, while the first electrodes 1111 have a continuous embodiment.

FIG. 11 c) illustrates a further embodiment 10c of the transducer 10, according to which the first electrodes 1111 are grouped in a first electrode group 1110 and the second electrodes 1121 are grouped in a second electrode group 1120. In this exemplary embodiment, the electrode groups 1110, 1120 are non-overlapping. The dimensions and spacings of the first electrodes 1111 in the first electrode group 1110 are substantially identical. The same applies to the distances and the dimensions of the electrodes 1121 of the second electrode group 1120.

FIG. 11 d) shows a further embodiment 10d of the transducer 10, which substantially corresponds to the embodiment 10c, with the exception that the first electrode group 1110 with the first electrodes 1111 is arranged in a first transducer part that is spatially separated from a second transducer part, in which the second electrode group 1120 with the second electrodes 1121 is arranged.

Figure 12:
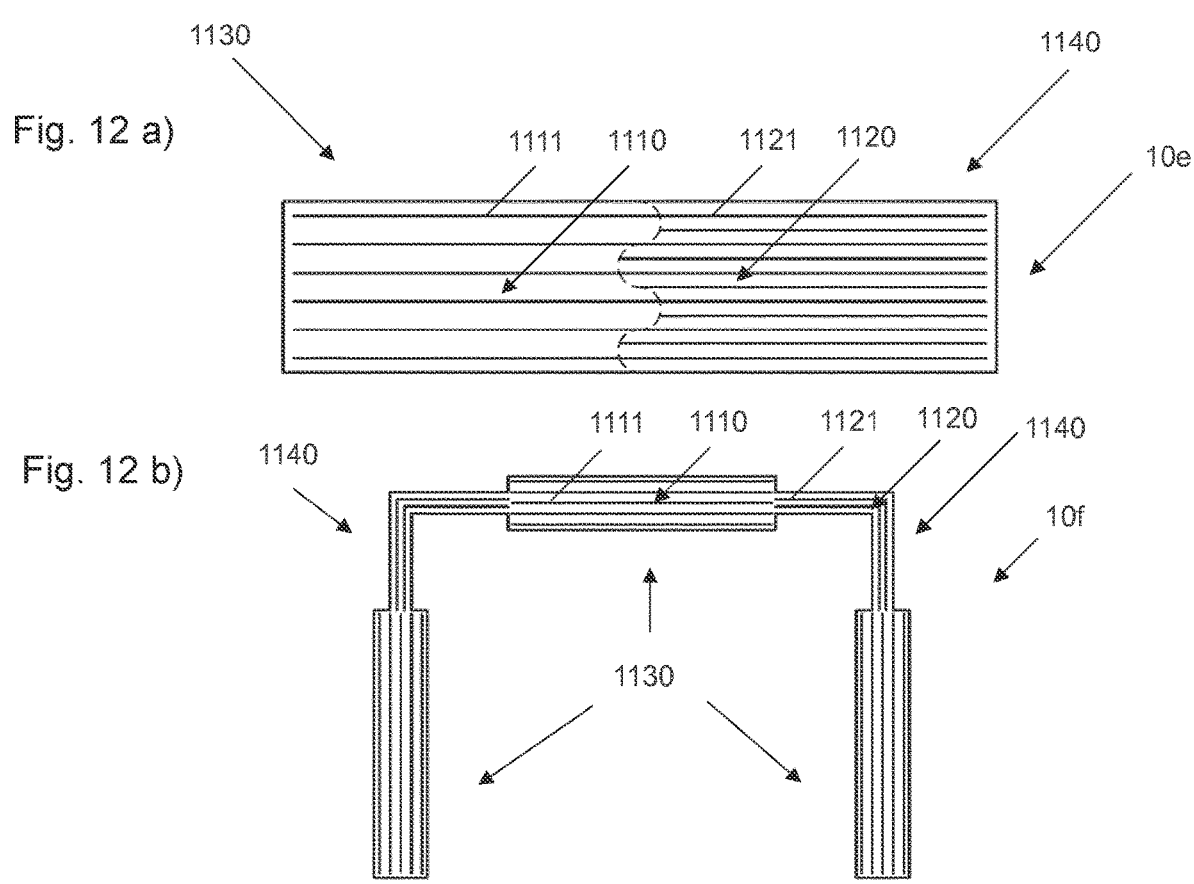
FIGS. 12a) and 12b) show schematic illustrations of two further embodiments of the transducer of the monitoring system.

FIG. 12 a) shows a further embodiment 10e of the transducer 10, wherein the transducer 10e is split into two regions 1030 and 1040, with the first electrode group 1110 being arranged in the first region 1130 and the second electrode group 1120 being arranged in the second region.

FIG. 12 b) shows an alternative embodiment 10d of the transducer 10, with the transducer 10f likewise being subdivided into regions 1030 and 1040. This embodiment is distinguished by virtue of the regions 1130 and 1140 not being contiguous in each case but being arranged alternately along the transducer 10f. Otherwise, the configuration of the transducer 10f corresponds to the configuration of the transducer 10e from FIG. 12 a). The transducer per se is configured here without interruptions, i.e., in contiguous fashion.

In the embodiment according to FIG. 12 b), the transducer 10f has a horseshoe-shaped or U shaped embodiment, with the second region 1140 being arranged in the corner region of the transducer 10f and the first region 1130 being arranged between the ends and the corner regions of the transducer 10f.

Figure 13:
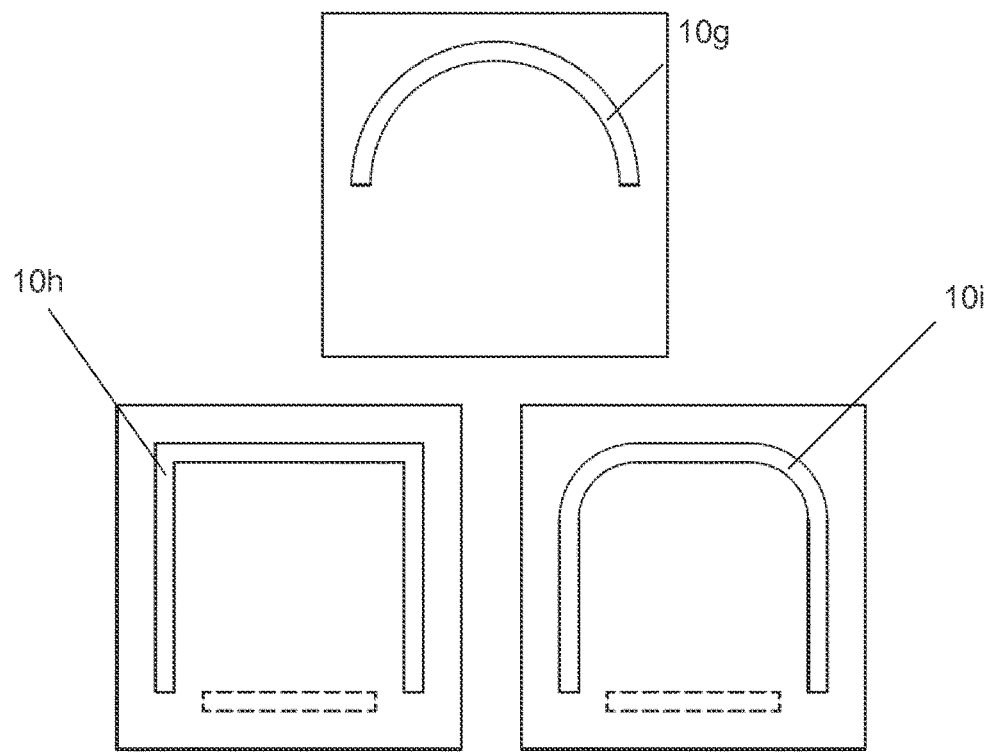
FIG. 13 shows a schematic illustration of three configurations in respect of the shaping of the transducer of the monitoring system.

FIG. 13 shows three further embodiments 10g, 10h, 10i of the transducer 10, all of which have a U-shaped form or horseshoe-shaped form. The transducer 10 according to the embodiment 10g does not have dedicated corner regions, while the embodiment 10h of the transducer 10 has sharp corner regions and the embodiment 10i of the transducer 10 has rounded corner regions of the horseshoe-shaped transducer 10.

Figure 14:
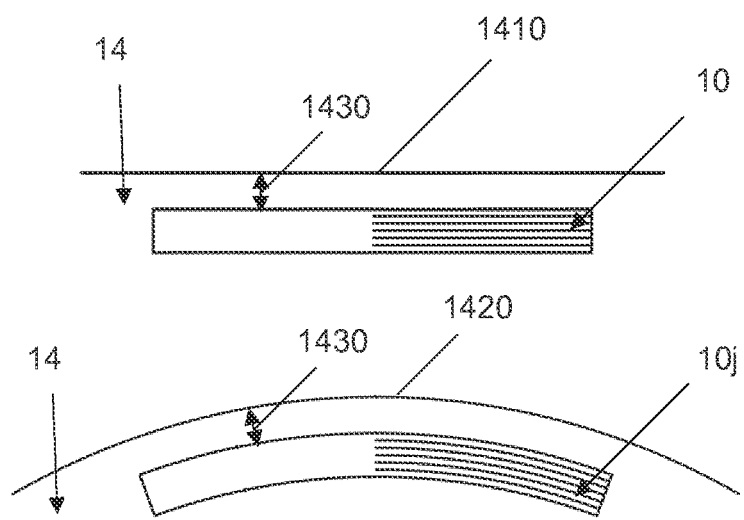
FIG. 14 shows, respectively in a schematic illustration, two configurations of the transducer arrangement in relation to an edge region of the protection panel of the monitoring system.

FIG. 14 schematically shows two exemplary embodiments for an arrangement of the transducer 10 on the substrate or the protection panel 14. The transducer 10, 10j is formed parallel to the edge 1410, 1420. Here, the edge 1420 is curved, and so the transducer 10j likewise has a curved form. It goes without saying that this exemplary embodiment is not restricted thereto, but that other edge or transducer forms can also be provided. Likewise, the edge distance 1430 between the transducer 10, 10j and the respective edge 1410 and 1420 is adjustable according to the frequencies of the sound waves produced by the respective transducer 10, 10j, and so sound waves reflected at the edge 1410, 1420 constructively interfere with sound waves emitted by the transducer 10, 10j.

Figure 15:
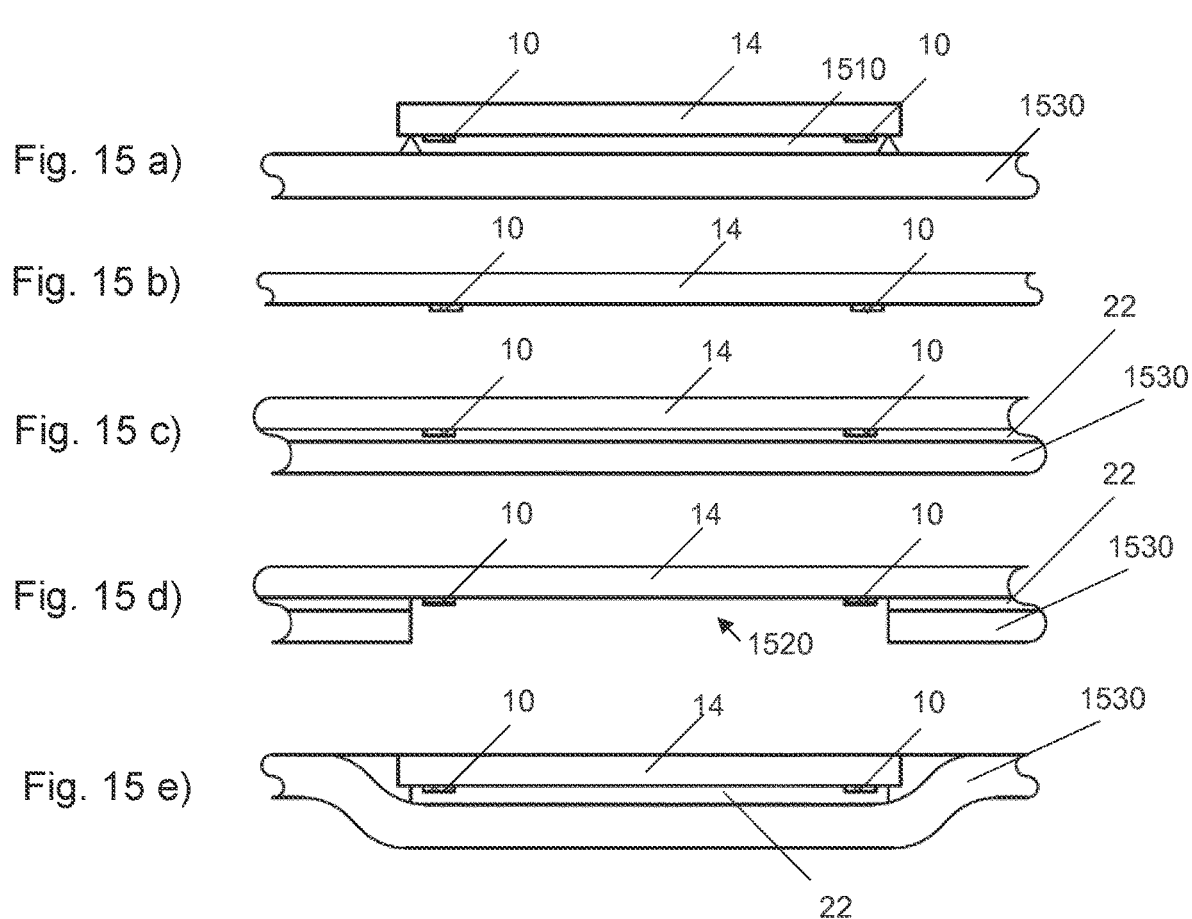
FIGS. 15a), 15b), 15c), 15d and 15e) show schematic sectional illustrations of five variants of possible transducer positioning in relation to a protection panel of the monitoring system.

FIG. 15 shows various embodiments of the arrangement of the transducer 10 on the substrate or the protection panel 14. As per the embodiment according to FIG. 15 a), the transducer is arranged in interstice 1510 between the substrate or the protection panel 14 and a further panel 1530. According to FIG. 15 b), the transducer 10 is arranged on a side of the substrate or the protection panel 14, said side, e.g., possibly being the side lying opposite possible precipitation on the substrate or the protection panel 14. FIG. 15 c) shows a further embodiment of the transducer arrangement, wherein the transducer is introduced into a laminated panel. The panel has a laminate layer 22 between the substrate or the protection panel 14 and a further panel 1530. The transducer 10 is arranged or laminated in this laminate layer. FIG. 15 d) likewise relates to a laminated panel made of the substrate or the protection panel 14 with the transducer 10, a laminate layer 22 and a further panel 1530. Here, the transducer is arranged in a thickness recess 1520. In this exemplary embodiment, the thickness recess 1520 is formed as a cutout in the laminate layer 22 and in the further panel 1530. Finally, FIG. 15 e) relates to an embodiment, according to which the further panel has a three-dimensional form and forms a receptacle space for the substrate or the protection panel 14 with the transducer 10 arranged thereon. The transducer 10 is arranged on the side of the substrate or the protection panel 14 facing the further panel 1530. The substrate or the protection panel 14 is connected to the further panel 1530 by way of a laminate layer 22, wherein the transducer 10 is inserted or laminated into this laminate layer 22.

Figure 16:
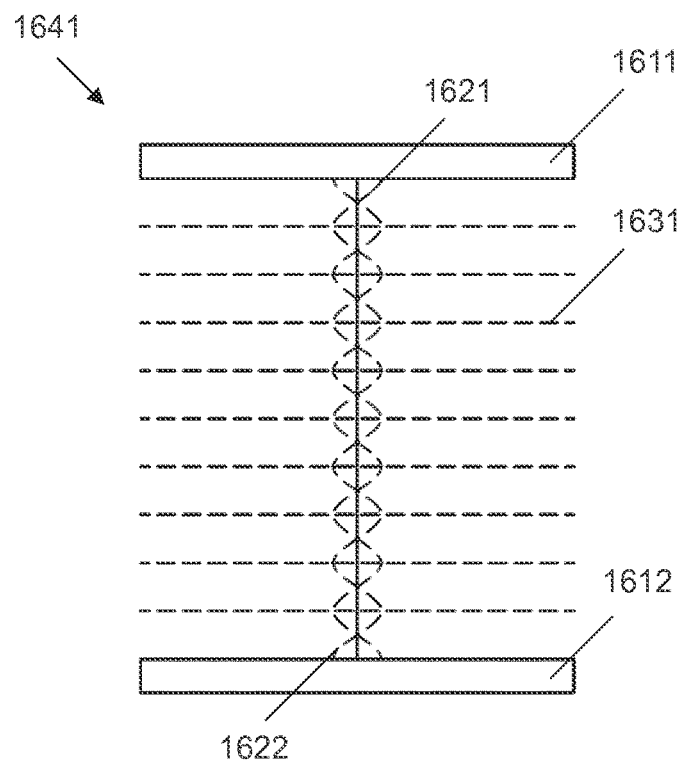
FIG. 16 shows a schematic illustration of a transducer group for producing a standing wave in the protection panel of the monitoring system.

FIG. 16 shows an exemplary embodiment of an arrangement of two transducers in 1611, 1612. The two transducers 1611, 1612 form a first transducer group 1641. The transducers 1611, 1612 are substantially aligned centered on one another along a central axis and each have a long and the short side. Therefore, the transducers 1611, 1612 have a substantially rectangular embodiment. The transducers 1611, 1612 oppose one another with a long side in each case. The distance between the transducers 1611, 1612 is dimensioned such that the distance substantially corresponds to a multiple of the wavelength of a wavelength of a surface or of a spatial wave produced by the transducers 1611, 1612.

The transducers 1611, 1612 emit ultrasonic waves 1621, 1622 and are operated with substantially the same frequency, same amplitude and same phase. As result of the transducers 1611, 1612 being arranged opposing one another, a standing wave 1631 with a large amplitude forms between the transducers 1611, 1612.

FIGS. 17 a)-c) shows three further embodiments of an arrangement of transducer groups 1741, 1742, 1743, 1744, each comprising at least two of the transducers 1711, 1712, 1713, 1714, 1715, 1716, 1717, 1718.

The embodiment according to FIG. 17 a) shows the cross-wise arrangement of two transducer groups 1741, 1742, wherein the first transducer group has two transducers 1711, 1712, corresponding to the exemplary embodiment according to FIG. 16, and the second transducer group 1742 likewise has two transducers 1713, 1714. In a wave propagation direction, the first transducer group 1741 is aligned substantially perpendicular to the second transducer group 1742. The standing wave 1731, which is formed between the transducers 1711, 1712 of the first transducer group 1741, thus extends substantially perpendicular to the standing wave 1732, which is formed between the transducers 1713, 1714 of the second transducer group 1742. By way of interferences between the standing waves 1731, 1732, a grid-like pattern of wave troughs and wave peaks forms between the transducers 1711, 1712, 1713 and 1714, wherein the grid cells are rectangular.

The embodiment according to FIG. 17 a) shows an arrangement of three transducer groups 1741, 1742, 1743, wherein the first transducer group has two transducers 1711, 1712, corresponding to the exemplary embodiment according to FIG. 16, the second transducer group 1742 likewise has two transducers 1713, 1714, and the third transducer group 1743 equally has two transducers 1715, 1716. The transducer groups 1741, 1742, 1743 with the pairwise opposite transducers 1711, 1712, 1713, 1717, 1715, 1716 are arranged in such a way that a substantially hexagonal external circumference of the arrangement arises. An angle of approximately 60° is formed in each case between the wave propagation directions of the standing waves 1731, 1732, 1733 of two transducer groups 1741, 1742, 1743 that are adjacent to one another in the circumferential direction of the arrangement. By way of interferences between the standing waves 1731, 1732, 1733, a grid-like pattern of wave troughs and wave peaks forms between the transducers 1711, 1712, 1713, 1714, 1715 and 1716, wherein the grid cells are triangular.

The embodiment according to FIG. 17 c) shows a further arrangement of four transducer groups 1711, 1712, 1713, 1714, wherein the first transducer group has two transducers 1711, 1712, corresponding to the exemplary embodiment according to FIG. 16. The second transducer group 1742 likewise has two transducers 1713, 1714 and is arranged substantially perpendicular in relation to the first transducer group 1741 in the respective wave propagation direction between the transducers 1711, 1712, 1713, 1714 of the transducer groups 1741, 1742. The third transducer group 1743 and the fourth transducer group 1744 likewise have respectively two transducers 1715, 1716 and 1717, 1718, respectively. An angle of approximately 45° is enclosed between the wave propagation direction of the standing waves 1731 of the first transducer group 1741 and the wave propagation direction of the standing waves 1733 of the third transducer group 1743. An angle of approximately 45° is likewise enclosed between the wave propagation direction of the standing waves 1732 of the second transducer group 1742 and the wave propagation direction of the standing waves 1734 of the fourth transducer group 1744. This results in a substantially octagonal external circumference of the arrangement. By way of interferences between the standing waves 1731, 1732, 1733, 1744, a grid-like pattern of wave troughs and wave peaks forms between the transducers 1711, 1712, 1713, 1714, 1715, 1716, 1717 and 1718.

Figure 18:
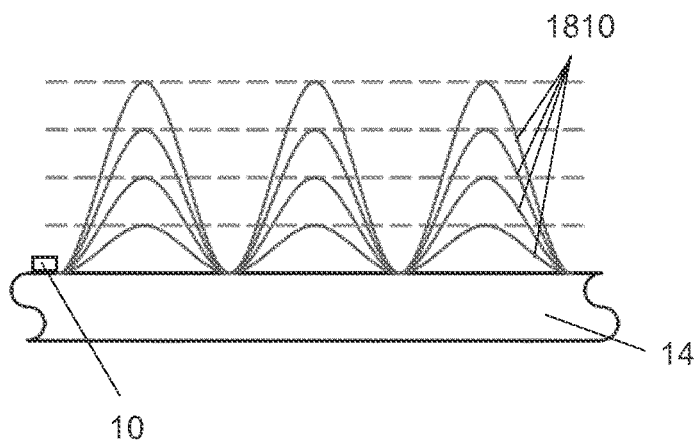
FIGS. 18a) and 18b) show schematic illustrations of different modes, in which the transducers of the monitoring system are operable.
Figure 18:
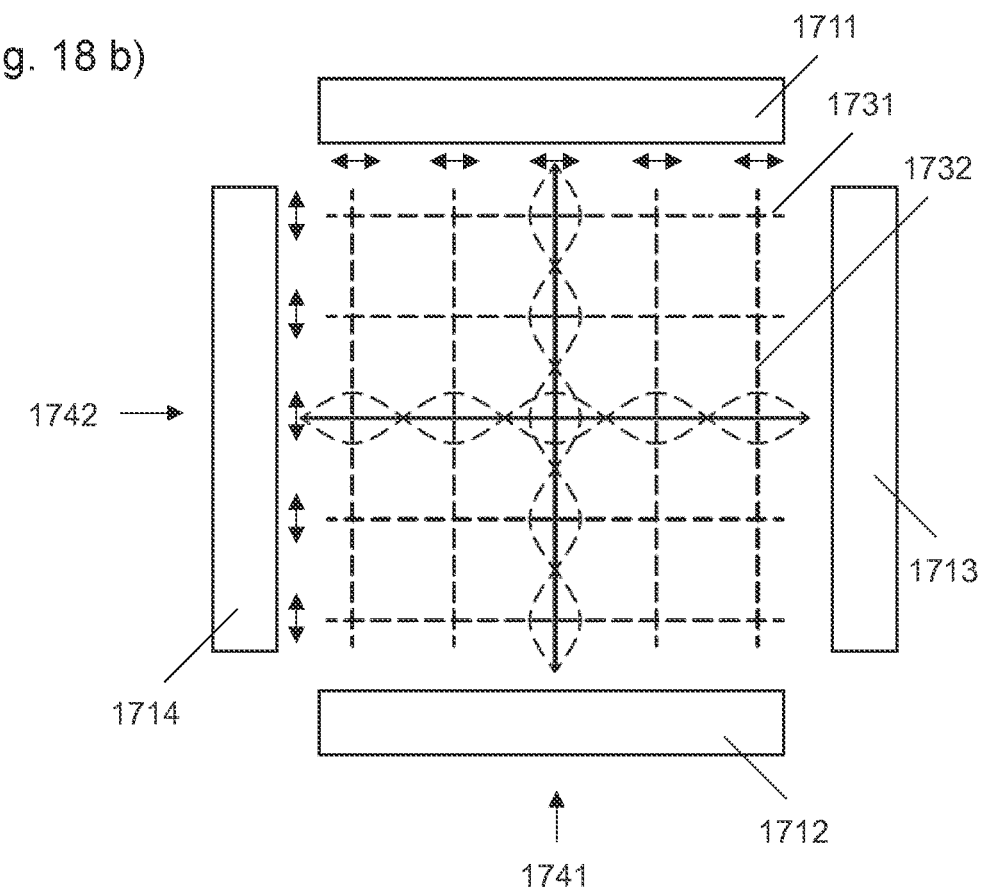

FIGS. 18 a) and b) show exemplary embodiments for modes of operation of the transducers 10. The transducer 10 is supplied with the driver signal by a generator (not illustrated here) and generates ultrasonic waves 1810. In FIG. 18 a), these ultrasonic waves 1810, which are emitted by a transducer 10 that is arranged on the substrate or the protection panel 14, have an amplitude modulation.

According to FIG. 18 b), a mode of operation for the exemplary embodiment of the transducer arrangement according to FIG. 17 a) is illustrated. The transducers 1711, 1712 of the first transducer group 1741 are actuated by a phase-modulated driver signal, while the transducers 1713, 1714 of the second transducer group 1742 are likewise actuated by phase-modulated driver signal. In this way, the maxima of the interfering standing waves 1731, 1732 are displaced.

Figure 19:
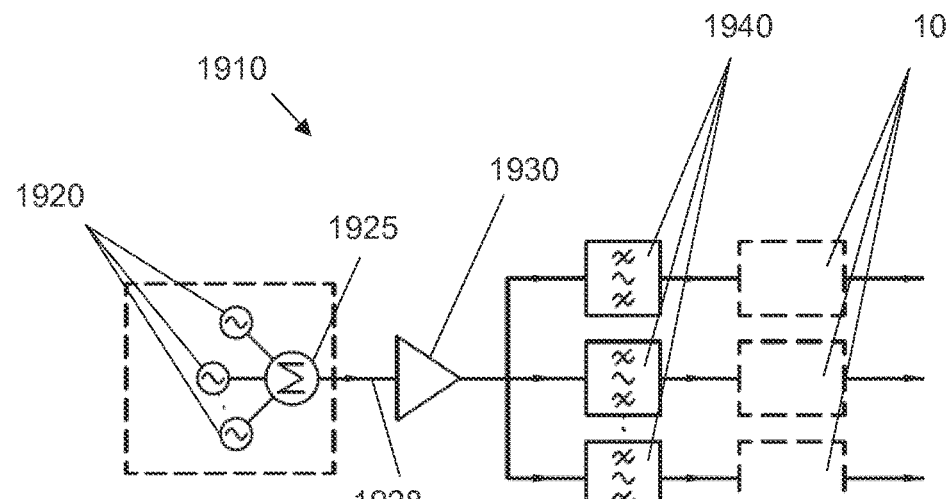
FIGS. 19a) and 19b) show schematic wiring diagram for two alternatives for an actuation circuit of the transducer of the monitoring apparatus.
Figure 19:
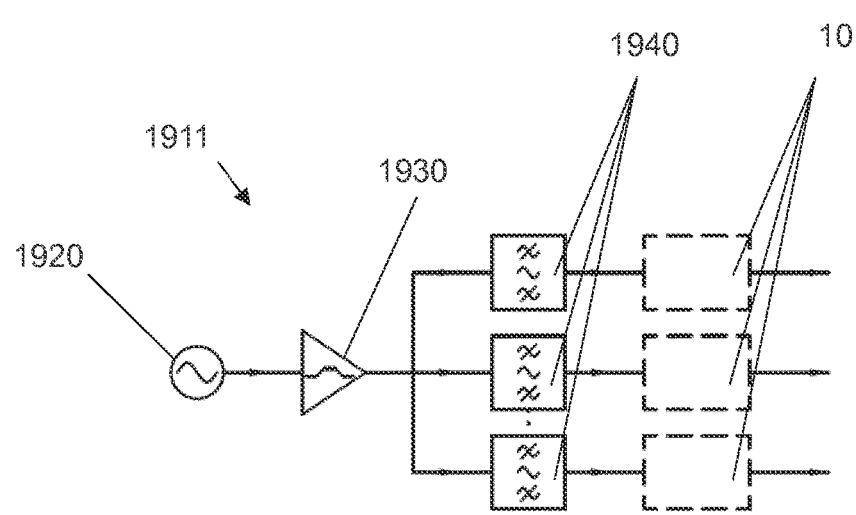

FIG. 19 a) and FIG. 19 b) show an embodiment of respectively one actuation circuit 1910, 1911 for the transducers 10.

As per the embodiment according to FIG. 19 a), the actuation circuit is supplied with at least one signal 1920, the at least one signal 1920 having a specific frequency. The at least one signal 1920 is summed by means of a summing unit 1925 to form a summed signal 1928. This summed signal 1928 is amplified by means of an amplifier 1930, which is embodied as a linear amplifier in this embodiment. Respectively one filter 1940 is arranged upstream of the at least one transducer 10 in the further signal path. The respective filter 1940 has an input for the amplified summed signal 1928 leaving the amplifier 1930 and at least one limit frequency, and so only a certain frequency range of the amplified summed signal 1928 is fed into the respective transducer 10.

As per the embodiment according to ☐☐☐☐☐☐☐☐☐, the signal 1920 being amplified by an amplifier 1930, which is embodied as a nonlinear amplifier in this embodiment, is provided for the actuation circuit 1911. Harmonics are produced by the amplifier 1930, said harmonics being separated from the amplified signal 1920 by the filters 1940, each of which having at least one limit frequency, and being supplied in correspondingly separated fashion to the at least one transducer 10.

Figure 20:
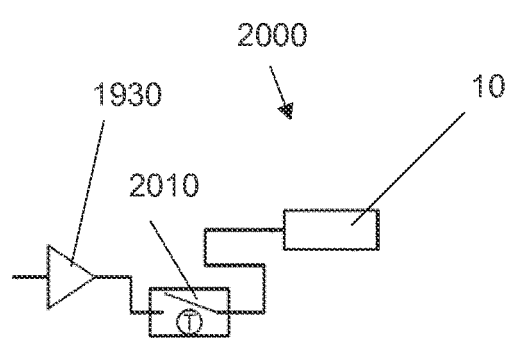
FIGS. 20a), 20b), 20c), 20d) and 20e) show schematic wiring diagrams for four alternatives for a temperature management system for monitoring the operating temperature of the transducers of the monitoring apparatus.
Figure 20:
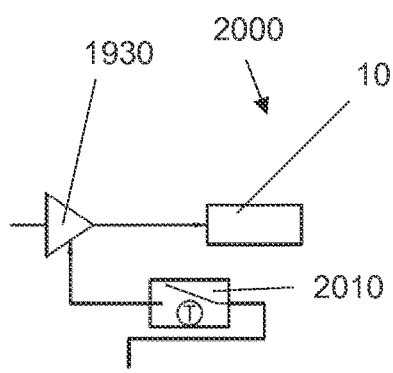
Figure 20:
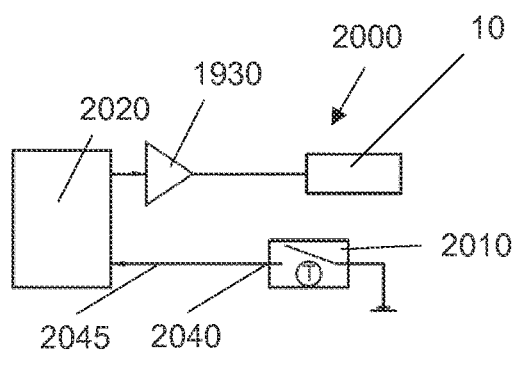
Figure 20:
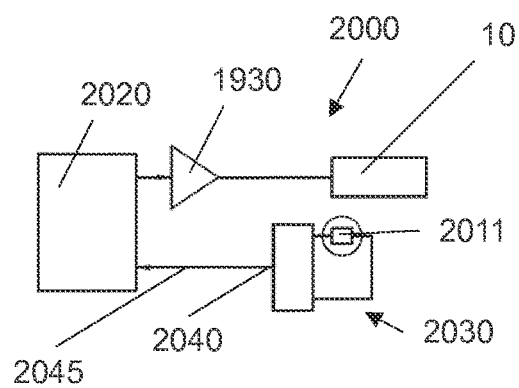
Figure 20:
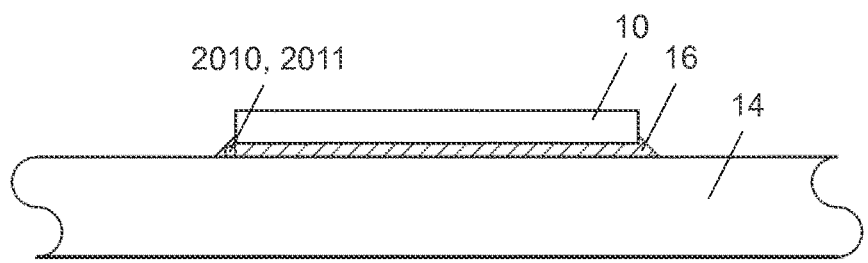

FIGS. 20 a) to d) show different embodiments of the temperature management system 2000 for an actuation circuit according to any one of the exemplary embodiments from FIG. 19. According to the embodiment as per FIG. 20 a), the temperature management system 2000 has a circuit breaker 2010, which is arranged between the amplifier and the transducer. The circuit breaker 2010 can be resetted manually and/or automatically. According to FIG. 20 b), the temperature management system 2000 has a circuit breaker 2010 with a control signal output 2040, from which a control signal 2045 is guided to the amplifier 1930. The amplifier is switchable by way of this control signal 2045, and so the signal to the transducer 10 is switched depending on the control signal 2045. FIG. 20 c) relates to an embodiment of the temperature management system 2000, according to which the circuit breaker is connected by way of the signal output 2040 to a control unit 2020 and the control unit 2020 controls a switching state of the amplifier 1930 depending on the signal supplied by the signal output 2040 of the circuit breaker 2010. FIG. 20 *d*) relates to a further embodiment of the temperature management system 2000. In this embodiment, the temperature management system comprises a temperature sensor 2011. By way of example, the latter can be embodied as an NTC or PTC thermistor. This temperature sensor is operated by a temperature sensor circuit 2030. The temperature sensor circuit 2030 has a signal output 2040, a control unit 2020 being connected thereto. The control unit 2020 controls a switching state of the amplifier 1930 depending on the signal supplied by the signal output 2040 of the circuit breaker 2010.

FIG. 20 *e*) shows a possible embodiment of the arrangement of the circuit breaker 2010 or of the temperature sensor 2011 of the temperature management system 2000. Here, the temperature sensor 2011 or the circuit breaker is let into a peripheral region of a connecting layer 16 arranged between the substrate or the protection panel 14 and the transducer 10.

FIGS. 21 *a*) to g) show different embodiments of protection panels 14 and transducers 10 arranged thereon.

FIGS. 21 *a*) to d) relate to the installation of a protection panel 14 or of the substrate in a panel frame 2110. Here, as per the variant according to FIG. 21 *a*), the substrate or the protection panel 14 has a Z-shaped embodiment in an abutment region 2130 at the outer circumference in order to engage with a flange region 2115 of the panel frame 2110. A seal 2120 is arranged between the panel frame 2110, in particular the flange region 2115, and the substrate or the protection panel 14 and, in particular, at a circumferential side of the abutment region 2130 thereof. At least one transducer 10 is arranged on the inner side IS of the substrate or of the protection panel 14.

As per the variant according to FIG. 21 *b*), the substrate or the protection panel 14 has an S-shaped embodiment in an abutment region 2130 at the outer circumference in order to engage with the flange region 2115 of the panel frame 2110. A seal 2120 is arranged between the panel frame 2110, in particular the flange region 2115, and the substrate or the protection panel 14 and, in particular, at a circumferential side of the abutment region 2130 thereof. At least one transducer 10 is arranged on the inner side IS of the substrate or of the protection panel 14.

In the embodiment according to FIG. 21 *c*), the substrate or the protection panel 14 has a substantially planar embodiment and abuts on the inner side IS of the flange region 2115 of the panel frame 2110. A seal 2120 is arranged in the overlap region of the flange region 2115 with the substrate or the protection panel 14. At least one transducer 10 is arranged on the inner side IS of the substrate or of the protection panel 14.

As per the embodiment according to FIG. 21 *d*), the substrate or the protection panel 14 rests with the inner side on a flange region 2115 of the panel frame 2110. A seal, in particular an O-ring seal, is arranged between the flange region of the panel frame and the substrate or the protection panel 14. At least one transducer 10 is arranged on the inner side IS of the substrate or of the protection panel 14.

FIGS. 21 *e*) to f) show different forms of protection panels 14 or substrates and preferred arrangements of transducers 10 in order not to impair, or only to minimally impair, the visual field through the substrate or the protection panel 14.

As per the embodiment according to FIG. 21 *e*), the substrate or the protection panel 14 has a substantially oval form in cross section with a flattened end side. The least one transducer 10 is arranged on the inner side IS of the substrate or of the protection panel 14 at the flattened end side.

In the embodiment of the substrate or the protection panel 14 according to FIG. 21 *f*), the substrate or the protection panel 14 has a drop-shaped form in cross section. The at least one transducer 10 is arranged at the pointed end of the substrate embodied with a drop-shaped form or of the protection panel 14 embodied with a drop-shaped form, in an abutment flange 2140 which extends substantially parallel to a long axis of the substrate or of the protection panel 14.

As per the embodiment according to FIG. 21 *g*), the substrate or the protection panel 14 has a semicircular embodiment in cross section and has an abutment flange, on the inner side IS of which the at least one transducer 10 is arranged.

Figure 22:
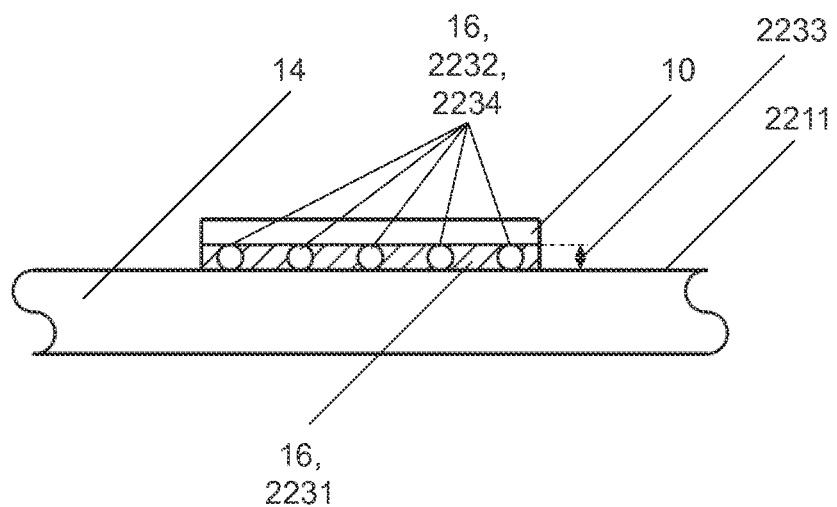
FIG. 22 shows an embodiment of the connection of the respective transducer to the protection panel of the monitoring apparatus.

FIG. 22 shows a schematic sectional view of the substrate or the protection panel 14 with a transducer 10 arranged thereon in a further embodiment. The transducer 10 is arranged on a surface 2211 of the substrate or of the protection panel 14. Between the substrate 14 and the transducer 10, there is a connecting layer or glass adhesive 16, which has a connecting material 2231 and a filler material 2232.

In this embodiment, the filler material 2232 in the form of molded bodies 2234 embodied as spheres or cylinders lies in the connecting material 2231. The molded bodies 2234 form a matrix for the connecting material 2231, and so the connecting layer or the glass adhesive 16 is accordingly constructed from two components. The thickness of the connecting layer or of the glass adhesive 16 is defined by the distance 2233 predetermined by the molded body 2234. The molded bodies 2234 abut both directly against the transducer 10 and directly against the substrate or the protection panel 14 and form an acoustic bridge.

All described camera systems are suitable, in particular, for the inclusion in a control system of a motor vehicle for autonomous driving, wherein a particularly high signal quality can be obtained, even under adverse ambient conditions, by the targeted cleaning of the visual field of the camera.

However, the invention is not restricted to one of the embodiments described above; instead, it can be modified in multifaceted ways. By way of example, the camera systems may also be embodied independently of an already present protection panel. In addition to the rear window and the side windows of a vehicle, camera systems with dedicated protection panels which are arranged in separate housings on the vehicle or which are integrated into another vehicle component, e.g. the rearview mirror, are also possible. A dome-like embodiment of the protection panel on the vehicle roof in order to obtain good all-round vision is particularly preferred.

Thus, in particular, the invention is not restricted to cameras for the autonomous driving of motor vehicles; instead, it can also be used in aircraft or watercraft for control or observation purposes.

Additionally, an optical monitoring or camera system according to the invention may have a stationary embodiment and may be particularly advantageous where there may be precipitation on the protection panel on account of the ambient conditions. By way of example, webcams, surveillance cameras in public spaces, wildlife observation cameras or surveillance cameras in workspaces, such as of machine tools, for example, may be mentioned as applications. In addition to the camera applications, embodiments according to the invention may also have other optical monitoring apparatuses, such as e.g. laser scanners or the angled mirrors that are often used in military applications.

All features and advantages, including structural details, spatial arrangements and method steps, that emerge from the claims, the description and the drawing may be essential to the invention, both on their own and in the very different combinations.

| List of reference signs | | | |
|---|---|---|---|
| 1, 100, 200, 300 | Camera system | 1621, 1622, 1810 | Ultrasonic wave |
| 10, 10 a-j, 1611, 1612, 1711, 1712, 1713, 1714, 1715, 1716, 1717, 1718 | Ultrasound transducer | 1631, 1731, 1732, 1733, 1734, 1641, 1741, 1742, 1743, 1744 | Standing wave Transducer group |
| 12, 112 | Additional protection panel | 1910, 1911 | Actuation circuit |
|  |  | 1920 | Signal |
| 14, 114, 214, 314 | Protection panel | 1925 | Summing unit |
| 16, 116 | Glass adhesive, connecting layer | 1928 | Summed signal |
|  |  | 1930 | Amplifier |
| 18, 118, 218, 318 | Outer glass layer | 1940 | Filter |
| 19, 119 | Cavity | 2000 | Temperature management system |
| 20 | Recess | 2010 | Circuit breaker |
| 22, 122, 222, 322 | Laminate layer | 2011 | Temperature sensor |
| 24, 124, 224, 324 | Inner glass layer | 2020 | Control unit |
| 1110 | First electrode group | 2040 | Signal output |
| 1111 | First electrode | 2045 | Control signal |
| 1120 | Second electrode group | 2110 | Panel frame |
| 1121 | Second electrode | 2115 | Flange region |
| 1130 | First region | 2120 | Seal |
| 1140 | Second region | 2130 | Abutment region |
| 1410, 1420 | Edge | 2140 | Abutment flange |
| 1430 | Edge distance | 2211 | Surface |
| 1510 | Interstice | 2231 | Connecting material |
| 1520 | thickness recess | IS | Inner side |
| 1530 | Further panel |  |  |
| 2232 | Filler material |  |  |
| 2233 | Distance |  |  |
| 2234 | Molded body |  |  |

What is claimed is:

1. An optical monitoring system for monitoring surroundings, comprising:
   an optical monitoring apparatus having
   a lens, and
   a protection panel (12; 14; 114; 314; 112; 218; 318) which protects the lens from precipitation and covers at least visual or scanning field which is captured by the lens of the monitoring apparatus,
   wherein the protection panel (12; 14; 114, 214; 314; 112; 218; 318) forms a substrate for at least one ultrasonic transducer (10; 10 a-j; 1611; 1612; 1711-1718) and is acoustically coupled to at least one ultrasonic transducer (10; 10 a-j; 1611; 1612; 1711-1718),
   wherein an edge distance (1430) of the at least one ultrasonic transducer (10; 10 a-j; 1611; 1612; 1711-1718) corresponds to a fraction or multiple of the wavelength of sound waves produced by the at least one ultrasonic transducer (10; 10 a-j; 1611; 1612; 1711-1718);
   wherein the sound waves are surface waves;
   wherein a constructive interference occurs between the sound waves produced by the at least one ultrasonic transducer (10; 10 a-j; 1611; 1612; 1711-1718) and a reflection of the surface waves from an edge of the substrate.

2. The optical monitoring system as claimed in claim 1, wherein a work frequency range of the at least one ultrasonic transducer is chosen depending on a thickness of the substrate such that the constructive interference occurs for spatial waves reflected at the edge of the substrate or an interface of the substrate.

3. The optical monitoring system as claimed in claim 1, wherein the at least one ultrasonic-transducer is arranged in an interstice between two substrates or within the substrate.

4. The optical monitoring system as claimed in claim 3, wherein the at least one ultrasonic-transducer is arranged within a layer of a multi-ply substrate.

5. The optical monitoring system as claimed in claim 1, wherein at least two transducers are grouped into the at least one ultrasonic transducer.

6. The optical monitoring system as claimed in claim 5, wherein the at least two-transducer corresponding to one another being actuated together and/or being aligned in a corresponding geometry with one or more other transducers.

7. The optical monitoring system as claimed in claim 1, wherein the at least one ultrasonic transducer (10; 10 a-j; 1611; 1612; 1711-1718) comprises at least one electrode group (1110, 1120) with at least one electrode (1111, 1121) in each case.

8. The optical monitoring system as claimed in claim 7, wherein the at least one ultrasonic transducer comprises at least one electrode on a side facing the substrate or the protection panel.

9. The optical monitoring system as claimed in claim 7, wherein the at least one ultrasonic transducer comprises a first electrode group and a second electrode group, wherein the first electrode group comprises at least two electrodes with a first distance and the second electrode group comprises at least two electrodes with a second distance.

10. The optical monitoring system as claimed in claim 7, wherein the first electrode group and the second electrode grou are embodied as elevated shapes of a transducer material.

11. The optical monitoring system as claimed in claim 7, wherein the first electrode group is meshed with the second electrode group in a comb-like manner.

12. The optical monitoring system as claimed in claim 7, wherein the first electrode group is arranged in a first region of the at least one ultrasonic transducer and the second electrode group is arranged in a second region of the at least one transducer.

13. The optical monitoring system as claimed in claim 1, wherein the at least one ultrasonic transducer (10; 10 *a-j*; 1611; 1612; 1711-1718) is L-shaped or U-shaped.

14. The optical monitoring system as claimed in claim 1, wherein the optical monitoring system is embodied as a member of a group consisting of: a camera, a laser scanner and a monitoring optical unit.

* * * * *